(12) United States Patent
Platenberg et al.

(10) Patent No.: US 7,770,097 B2
(45) Date of Patent: Aug. 3, 2010

(54) REDUNDANT PATH COMMUNICATION METHODS AND SYSTEMS

(76) Inventors: Scott Platenberg, 756 Winding Way, Encinitas, CA (US) 92024; Peter Ekner, 11921 Tivoli Park Row #5, San Diego, CA (US) 92128; James Troxel, 20326 Cedar La., Escondido, CA (US) 92029; Gary Morton, 871 Viva Ct., Solana Beach, CA (US) 92075

( * ) Notice: Subject to any disclaimer, the term of this patent is extended or adjusted under 35 U.S.C. 154(b) by 854 days.

(21) Appl. No.: 11/513,876

(22) Filed: Aug. 31, 2006

(65) Prior Publication Data

US 2007/0011587 A1    Jan. 11, 2007

Related U.S. Application Data

(63) Continuation of application No. 10/227,465, filed on Aug. 23, 2002, now Pat. No. 7,127,669.

(60) Provisional application No. 60/385,027, filed on May 31, 2002.

(51) Int. Cl.
*G06F 11/10* (2006.01)
*G06F 11/18* (2006.01)

(52) U.S. Cl. ..................... 714/807; 375/299
(58) Field of Classification Search ............... 714/807; 375/299
See application file for complete search history.

(56) References Cited

U.S. PATENT DOCUMENTS

| | | | |
|---|---|---|---|
| 4,477,895 A | 10/1984 | Casper et al. | |
| 4,684,796 A | 8/1987 | Johnson | |
| 4,819,225 A | 4/1989 | Hochstein | |
| 5,034,966 A | 7/1991 | Hochstein | |
| 5,051,979 A | 9/1991 | Chaudhuri et al. | |
| 5,280,487 A | 1/1994 | Bergkvist | |
| 5,436,915 A | 7/1995 | Loebig | |
| 5,506,956 A | 4/1996 | Cohen | |
| 5,533,041 A | 7/1996 | Matsuda et al. | |
| 5,577,196 A | 11/1996 | Peer | |
| 5,621,722 A | 4/1997 | Edmaier et al. | |
| 5,631,896 A | 5/1997 | Kawase et al. | |
| 5,786,923 A | 7/1998 | Doucet et al. | |
| 5,787,070 A | 7/1998 | Gupta et al. | |
| 5,910,851 A | 6/1999 | Flaherty | |
| 6,049,593 A * | 4/2000 | Acampora | 379/56.2 |
| 6,061,555 A | 5/2000 | Bultman et al. | |
| 6,079,882 A | 6/2000 | Chien | |
| 6,084,694 A | 7/2000 | Milton et al. | |
| 6,122,106 A | 9/2000 | Noyes et al. | |

(Continued)

FOREIGN PATENT DOCUMENTS

EP    0 689 304    12/1995

(Continued)

*Primary Examiner*—Stephen M Baker

(57) ABSTRACT

The systems and methods described herein provide a redundant communication path. The systems and methods can provide a second source for the same data under many circumstances. These circumstances can include, for example, 1) when data incurs errors during transmission in the communication link network, 2) when a communication link in the communication link network experiences transient blockage, 3) when a communication link experiences prolonged or indefinite blockage, and 4) when an optical transceiver unit within the communication link network experiences a hardware failure and is unable to perform its tasks.

24 Claims, 18 Drawing Sheets

U.S. PATENT DOCUMENTS

| | | | |
|---|---|---|---|
| 6,154,297 | A | 11/2000 | Javitt et al. |
| 6,239,888 | B1 | 5/2001 | Willebrand |
| 6,678,259 | B1 * | 1/2004 | Schwengler ................. 370/329 |
| 6,801,687 | B2 * | 10/2004 | Pierce ......................... 385/28 |
| 6,850,704 | B1 | 2/2005 | Dave |
| 7,127,669 | B2 * | 10/2006 | Platenberg et al. .......... 714/820 |
| 7,366,202 | B2 * | 4/2008 | Scherzer et al. ............. 370/480 |

FOREIGN PATENT DOCUMENTS

| | | |
|---|---|---|
| EP | 0 696 858 | 2/1996 |
| EP | 1 054 520 | 11/2000 |
| JP | 20224112 | 8/2000 |
| WO | 00/04653 | 1/2000 |
| WO | 00/04660 | 1/2000 |
| WO | 00/08512 | 2/2000 |
| WO | 00/16503 | 3/2000 |
| WO | 01/52450 | 7/2001 |

\* cited by examiner (EXEMPLARY OPERATION)

(HARDWARE REDUNDANCY)

STATE DIAGRAM FOR
HARDWARE REDUNDANCY (HARDWARE FAILURE)

DATA PROTECTION (A-ACTIVE OTU)

(A-STANDBY OTU)

(B-ACTIVE OTU)

REDUNDANT PATH COMMUNICATION METHODS AND SYSTEMS

This application is a continuation of U.S. patent application Ser. No. 10/227,465, entitled "REDUNDANT PATH COMMUNICATION METHODS AND SYSTEMS", filed Aug. 23, 2002, now U.S. Pat. No. 7,127,669, which claims the benefit of U.S. provisional patent application Ser. No. 60/385,027, filed May 31, 2002.

BACKGROUND OF THE INVENTION

1. Field of the Invention

The present invention relates to a system and method for a redundant path communication system.

2. Description of the Related Art

Currently, the primary method for data transmission between remote locations utilizes wired lines or fiber-optic cables. Some of the costs associated with this method are due to the expense in obtaining rights-of-way for the cable runs as well as installing the cables by burying or hanging. While this method has proven successful where great distances separate two locations, it is prohibitively expensive between locations that are within close proximity to one another. The dramatic growth and a demand for broadband services and the time and expense associated with deploying traditional wired lines or fiber-optic cables have led to the development of new wireless broadband access technologies. One of these new wireless technologies employs a light amplification stimulated emission of radiation (laser) beam to transmit information. Such a system may consist of at least two optical transceivers accurately aligned to each other with a clear line of sight to deliver the information using such a laser beam.

However, such communication laser beams may be viewed as being unreliable because of the possibility of link interruptions. Such interruptions include actual optical link interruptions due to flying objects, window washers, etc., and can be of short or long duration and occur at unpredictable frequencies. Additionally, communication laser beams employ complicated electronics which are exposed to severe environmental conditions. These environmental conditions can further contribute to the potential unreliability of such systems. Such systems are often subject to a single point of failure.

SUMMARY OF THE INVENTION

The systems and methods of the present invention have several features, no single one of which are solely responsible for its desirable attributes. Without limiting the scope of this invention as expressed by the claims which follow, its more prominent features will now be discussed briefly. After considering this discussion, and particularly after reading the section entitled "Detailed Description of the Preferred Embodiments," one will understand how the features of this invention provide several advantages over traditional free-space optical communication networks. The systems and methods of the invention provide many aspects which include, but are not limited to:

When data incurs errors during transmission in the communication link network, the systems and methods can provide a second source for the same data without data loss.

When a communication link in the communication link network experiences transient blockage, the systems and methods can provide a second source for the same data without data loss.

When a communication link experiences prolonged or indefinite blockage, the systems and methods can provide a second source for the same data without data loss.

When an optical transceiver unit within the communication link network experiences a hardware failure and is unable to perform its tasks, the systems and methods can re-route the data via a second path through the link network.

One aspect is a method for communicating using a primary link and a redundant link, wherein data packets transmitted via the primary link and the redundant link are substantially the same. The method comprises transmitting a first series of packets from a first transceiver to a second transceiver along a primary link, forwarding a second series of packets which corresponds to the first series of packets from the first transceiver to a third transceiver via a first cross-connect, transmitting the second series of packets from the third transceiver to a fourth transceiver via the redundant link, and forwarding the second series of packets from the fourth transceiver to the second transceiver via a second cross-connect. The method further comprises storing a portion of the first series of packets at the second transceiver until a corresponding packet from the second series of packets is received by the second transceiver, determining a quality for the first series of packets and the second series of packets, and forwarding either the first series of packets or the second series of packets based on the quality.

Another aspect is a system configured to communicate using a primary link and a redundant link, wherein packets transmitted via the primary link and the redundant link are substantially the same. The system comprising a first transceiver configured to transmit a series of first packets over a primary link and forward a series of second packets which corresponds to the first series of packets over a first cross-connect, a second transceiver configured to receive the second series of packets via the first cross-connect and transmit the second series of packets over the redundant link, a third transceiver configured to receive the second series of packets via the redundant link and transmit the second series of packets over a second cross-connect, and a fourth transceiver configured to receive the first series of packets and the second series of packets and determine a quality for the first and second series of packets. The system further comprising a first buffer in communication with the fourth transceiver and configured to store a portion of the first series of packets, a second buffer in communication with the fourth transceiver and configured to store a portion of the second series of packets, and a link controller module in communication with the first and second buffers and configured to select packets from the first buffer and the second buffer.

Another aspect is a transceiver configured to receive and transmit data packets over a free space optical link, a cross-connect, and an external network. The transceiver comprising a payload module configured to adapt a data packet for transmission on an internal network and on the external network, wherein the internal network and the external network employ different transmission protocols, a cross-connect module configured to communicate the data packet between the transceiver and a standby transceiver, a free space optical module configured to adapt the data packet for its transmission and reception as an optical signal, and a logic device configured to determine a quality of an incoming data packet from the free space optical link, and configured to select between the data packet received from the free space optical module and from the data packet received from the cross-connect link based on the quality.

DETAILED DESCRIPTION OF THE PREFERRED EMBODIMENTS

The preferred embodiments of the present invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific preferred embodiments of the present invention.

Figure 1:
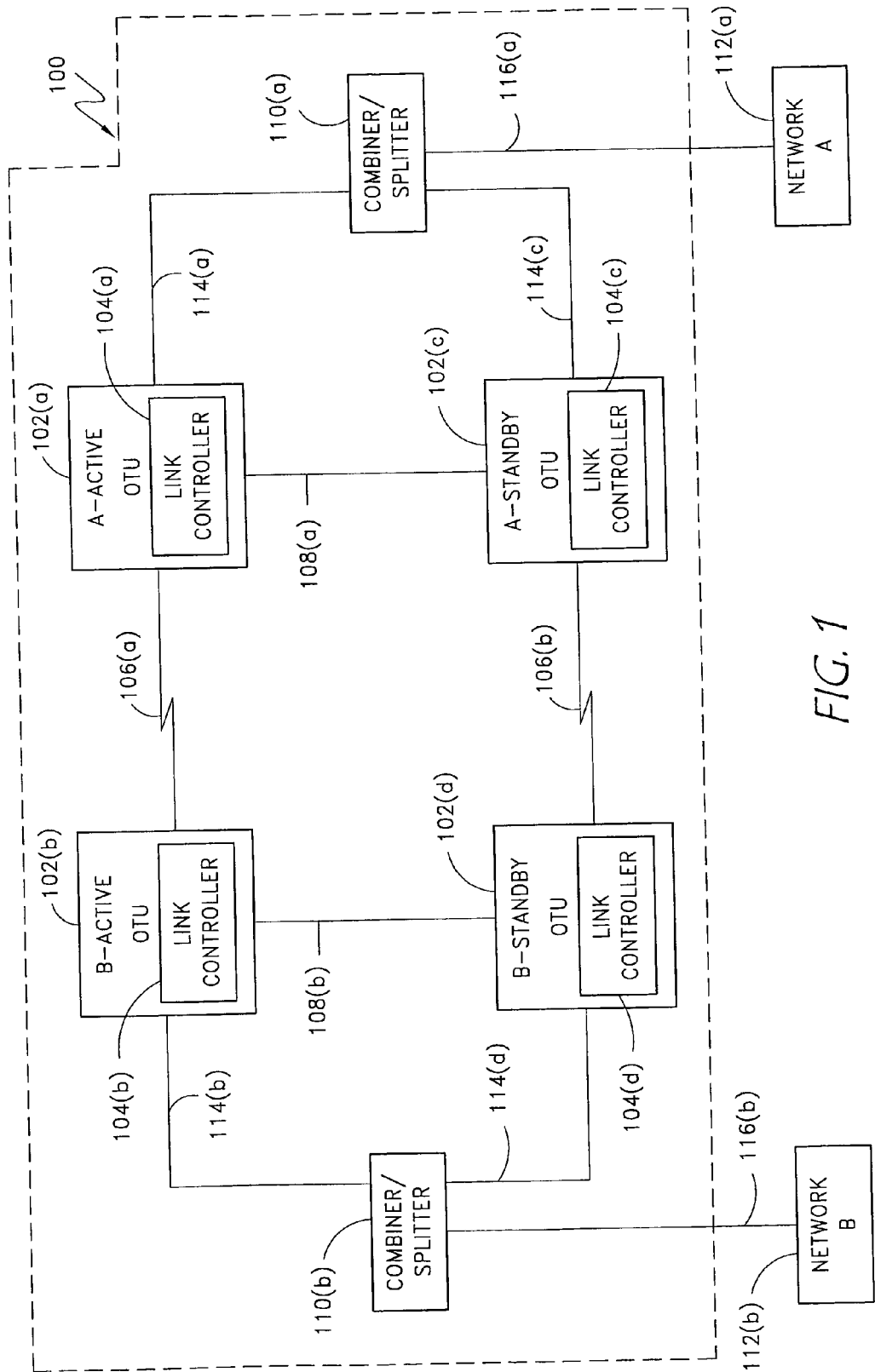
FIG. 1 is a block diagram of a communication link network that includes a primary link 106(a) and a redundant link 106(b).

FIG. 1 is a block diagram of an exemplary communication link network 100 which provides a communication link between a network A 112(a) and a network B 112(b). The communication link network 100, the network A 112(a), and the network B 112(b) are coupled via communication links 116(a), 116(b). The communication link network 100 includes four transceiver units (OTU) 102(a)-(d) and two combiner/splitter modules 110(a)-(b). The OTUs can be FSO transceivers, radio frequency transceivers, microwave transceivers, fiber optical transceivers or combinations of the foregoing. The OTUs 102(a)-(d) and the combiner/splitter modules 110(a)-(b) are interconnected by communication links 106(a), 106(b), 108(a), 108(b), 114(a), 114(b), 114(c), 114(d). The communication links 106(a), 106(b), 108(a), 108(b), 114(a), 114(b), 114(c), 114(d) are bi-directional in nature so that data can be sent in both directions along each communication link. The data can be packetized for its transmission through the communication link network 100. The communication links can include free-space optical (FSO) links, fiber optic links, radio frequency links, and microwave links. The topology and weather between communicating OTUs 102 influences the selection of a link technique therebetween. For example, the microwave link can be used in regions susceptible to fog. In regions where heavy rain often occurs, an FSO link can be used.

Each of the communication links 106(a), 106(b), 108(a), 108(b), 114(a), 114(b), 114(c), 114(d) within the communication link network 100 can use a different technique. In one embodiment an FSO link and a microwave link are both used within the communication link network 100. In this embodiment, the use of both the FSO link and the microwave link capitalizes on their complementary nature. The reliability of an FSO link over long distances can suffer during fog conditions. The microwave link can be limited in distance due to attenuation caused by heavy rain. However, the combination of the FSO link and the microwave link forms a single highly reliable communication link that operates even when fog or heavy rain occurs. When fog occurs, the communication system 100 can rely upon the microwave link. When heavy rain occurs, the communication system 100 can rely upon the FSO link. In one embodiment, the microwave link operates in the 60 GHz frequency range. The communication link network 100 is configured to utilize the communication links 106(a), 106(b), 108(a), 108(b), 114(a), 114(b), 114(c), 114(d) as necessary to provide a single highly reliable communication link between the network A 112(a) and the network B 112(b).

The combiner/splitter module 110(a) and the network A 112(a) are coupled via the communication link 116(a). The combiner/splitter module 110(a) and the OTU 102(a) are coupled via the communication link 114(a). The combiner/splitter module 110(a) and the OTU 102(c) are coupled via the communication link 114(c). The OTU 102(a) is further coupled to the OTU 102(c) via the communication link 108(a). The communication link 108(a) can be, for example, a fiber-optic cross-connect link. The OTU 102(a) comprises a link controller module 104(a). The OTU 102(c) also comprises a link controller module 104(c). Though the link controller modules 104 (c-d) are depicted in FIG. 1 as part of an OTU, they can be located separately from the OTU's.

The OTU 102(a) and the OTU 102(b) are coupled via the communication link 106(a). Communication link 106(a) can be, for example, an FSO link. The OTU 102(c) and the OTU 102(d) are coupled via the communication link 106(b). Communication link 106(b) can be, for example, an FSO link. The OTU 102(b) is further coupled to the OTU 102(d) via the communication link 108(b). The communication link 108(b) can be, for example, a fiber-optic cross-connect link. The OTU 102(d) comprises a link controller module 104(d). The OTU 102(b) also comprises a link controller module 104(b).

The OTU 102(b) and the combiner/splitter 110(b) are coupled via the communication link 114(b). The OTU 102(d) and the combiner/splitter 110(b) are coupled via the communication link 114(d). The combiner/splitter 110(b) and the network B 112(b) are coupled via the communication link 116(b).

The network A 112(a) can be the Internet, an Intranet, or other communication network that sends to and receives data from the network B 112(b).

The combiner/splitter module 110(a) is configured to receive from and transmit data to the network A 112(a). The combiner/splitter module 110(a) is configured to receive from and transmit data to the OTU 102(a) via the communication link 114(a). The combiner/splitter module 110(a) is further configured to receive from and transmit the data to the OTU 102(c) via the communication link 114(c). The combiner/splitter module 110(a) transmits the same data to the OTUs 102(a), 102(c). Depending on the operational states of the OTU 102(a) and the OTU 102(c), the OTU 102(a) or the OTU 102(c) utilizes the data from the combiner/splitter module 110(a). The operational states available for the OTUs 102(a), 102(c) are initialization, active, and standby. One of the OTUs 102(a), 102(c) is active while the other OTU is on standby. If an OTU is not active or standby, it is in an initialization state.

The OTU that is designated as active is configured to receive and transmit data with the combiner/splitter module 110(a). In FIG. 1, the OTU 102(a) is the "active" OTU and the OTU 102(c) is the "standby" OTU. Thus, the combiner/splitter module 110(a) transmits and receives data with the OTU 102(a) via the communication link 114(a). The combiner/splitter module 110(a) still transmits the same data to the standby OTU 102(c) via communication link 114(c)(1). However, the OTU 102(c) does not utilize the data. Should the active OTU 102(a) fail, the OTU 102(c) enters an active state while the OTU 102(a) becomes the standby OTU. The OTUs 102(c) then utilizes the data that the combiner/splitter module 110(a) transmit to the OTUs 102(c).

The OTU 102(a) includes the link controller module 104(a). For data received from the combiner/splitter module 110(a), the link controller module 104(a) is configured to frame the data for its further transmission within the link network 100. For example, the data from the combiner/splitter module 110(a) is received by the OTU 102(a) and placed into frames. The link controller module 104(a) is further configured to insert status and or management messages within the frame type.

The data framed by the link controller module 104(a) is transmitted in two direction by the OTU 102(a). The OTU 102(a) transmits the framed data to the OTU 102(b) via the communication link 106(a) and to the OTU 102(c) via the communication link 108(a).

For data received over the communication link 106(a) from the OTU 102(b), the link controller module 104(a) deframes the data. The link controller module 104(a) buffers the deframed data in a first buffer. The framing and deframing by an exemplary link controller is described with reference to FIGS. 8 and 9. The buffering process by an exemplary link controller is described with reference to FIGS. 12-14. The link controller module 104(a) is further configured to insert and read status and/or management messages within the frame.

The OTU 102(c) is configured to transmit and receive data with the OTU 102(a) via the communication link 108(a). The OTU 102(c) is further configured to transmit and receive data with the OTU 102(d) via the communication link 106(b). The OTU 102(c) comprises the link controller module 104(c). The pair of OTUs 102(b) and 102(d) operate in the same manner as the pair of OTUs 102(c) and 102(cc).

The link controller modules 104(a)-(d) are shown in each of the OTUs 102(a)-(d). However, as described above, the complete functionality of the link controller module 104 is not required in each of the OTUs 102(a)-(d). Depending on the current status of the OTU 102 that is associated with a given link controller module 104(a)-(d), for example, active/standby and receiving/transmitting, the link controller module's configuration can vary.

Figure 2:
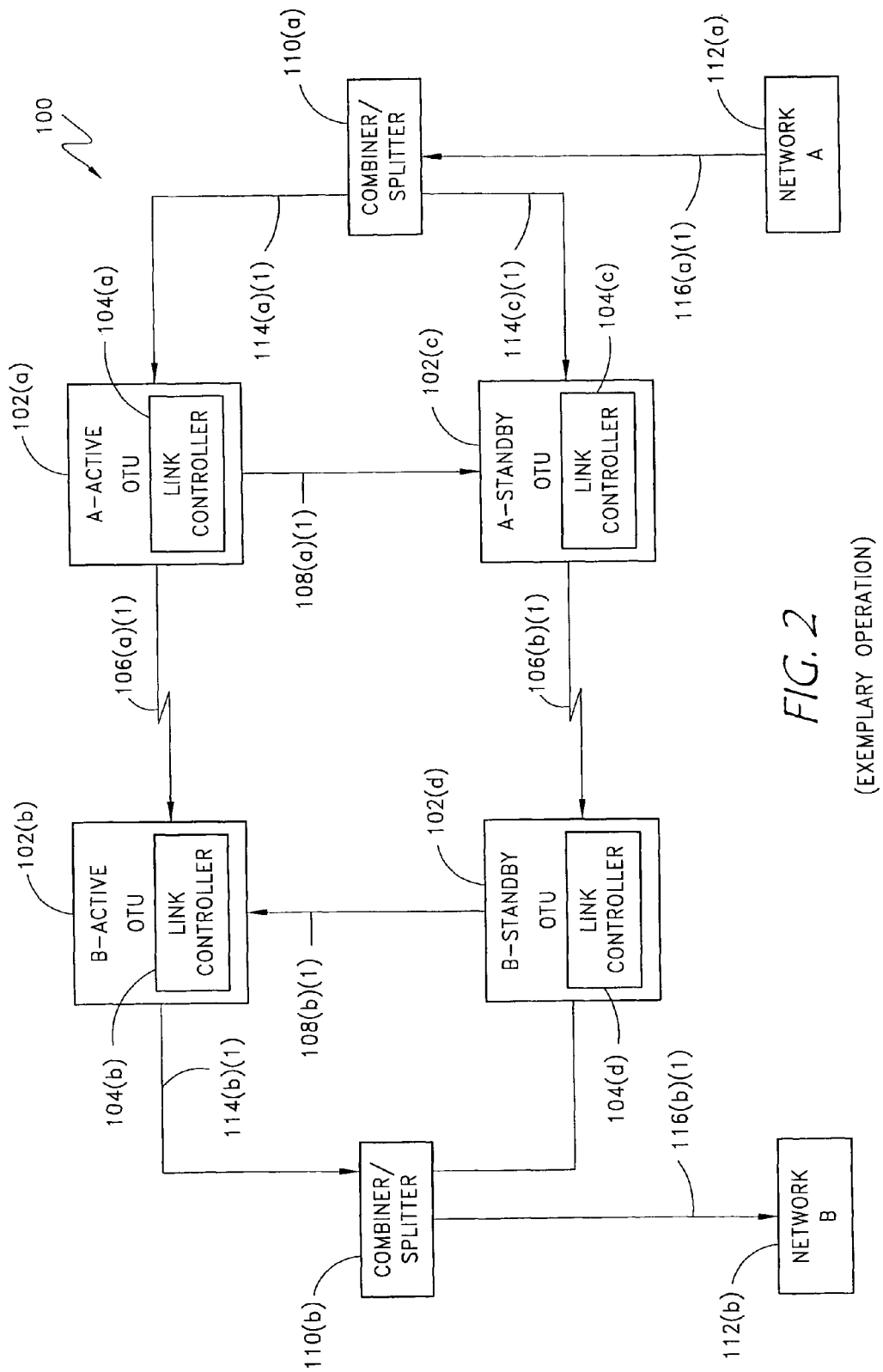
FIG. 2 shows the data flow path from network A to network B through the communication link network of FIG. 1 when the primary link 106(a) is operational.

FIG. 2 shows the data flow path from network A 112(a) to network B 112(b) through the communication link network 100 described in FIG. 1 when the communication link 106(a) is operational. Since all of the communication links are bi-directional, each communication link includes an outgoing communication path from an OTU 102(a)-(d) and an incoming communication path to the same OTU. For ease of description, only one of the two paths is shown for the communication links used in FIG. 2. For example, the outgoing path of the communication link 106(a) from the OTU 102(a) to the OTU 102(b) is shown as communication link 106(a)(1). Since FIG. 2 shows the data flow path from the network A 112(a) to the network B 112(b), the incoming path of the communication link 106(a) is not shown.

The combiner/splitter module 110(a) forwards the data from the network A 112(a) to the OTU 102(a) via a communication link 114(a)(1) and to, the OTU 102(c) via a communication link 114(c)(1). The OTU 102(a) then transmits the data via a communication link 106(a)(1) and a communication link 108(a)(1). The data transmitted via the communication link 106(a)(1) and the data transmitted via the communication link 108(a)(1) are the same.

The link controller module 104(c) in the OTU 102(c) receives the data from the OTU 102(a) via the communication link 108(a)(1). The link controller module 104(c) in the OTU 102(c) transmits the received data over the communication link 106(b)(1) to the OTU 102(d). The link controller 104(d) in the OTU 102(d) then forwards the received data to the OTU 102(b) over the communication link 108(b)(1).

The link controller module 104(b) is configured to monitor the quality of the data received via the communication link 106(a)(1). The link controller module 104(b) is further configured to monitor the quality of the data received over the communication link 108(b)(1). Once both of the data packets are received by the OTU 102(b), the link controller 104(b) provides either the data from the OTU 102(d) or the data from the OTU 102(a) to the combiner/splitter module 110(b). The combiner/splitter module 110(b) provides the data received from the OTU 102(b) to the network B 112(b).

In FIG. 2, the communication link 106(a)(1) is operational and the OTUs 102(a), 102(b) are designated as active OTUs. If the data transmitted via the communication link 106(a)(1) is valid and thus error free, the link controller module 104(b) in the active OTU 102(b) will provide the data received via the communication link 106(a)(1) to the combiner/splitter module 110(b). If the data received via the primary link 106(a) is not error free and thus invalid, the link controller module 104(b) provides the data received via the communication link 108(b)(1) to the combiner/splitter module 110(b). If the link controller module 104(b) provides the data received via the communication link 106(a)(1) to the combiner/splitter module 110(b), the communication link network 100 designates the link 106(a)(1) as the primary link. Alternatively, if the link controller module 104(b) provides the data received via the communication link 106(b)(1) to the combiner/splitter module 110(b), the communication link network 100 designates the link 106(b)(1) as the primary link.

The operation of the communication link network 100 when a hardware failure occurs is described with reference to FIG. 5. The operation of the communication link network 100 when a communication link is blocked is described with reference to FIG. 10.

Figure 3:
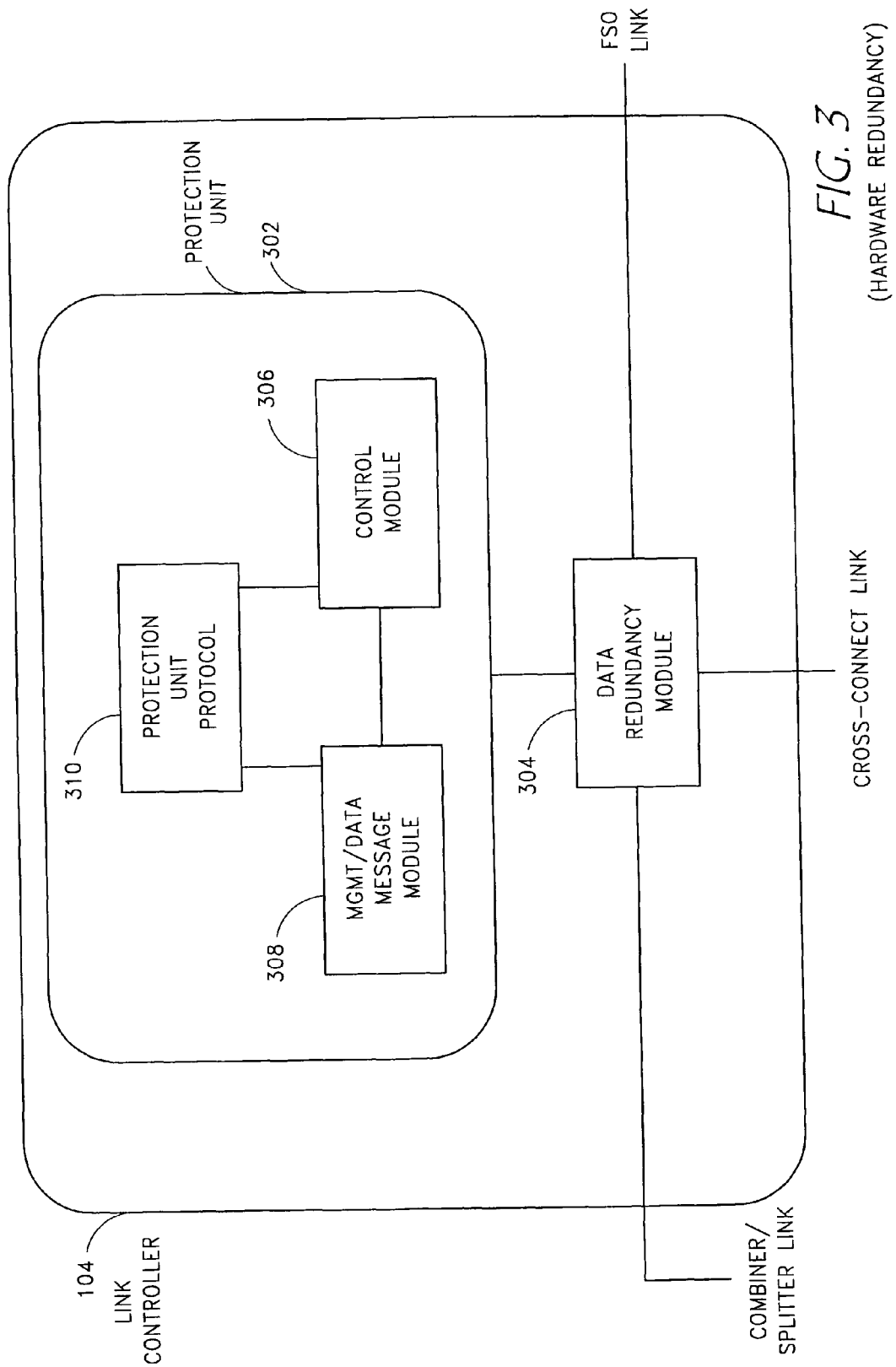
FIG. 3 is a block diagram of the link controller module from FIG. 1 showing the protection unit module.

FIG. 3 is a block diagram of the link controller module 104(b) from FIG. 1 showing a protection unit module 302 and a data redundancy module 304. The protection unit module 302 is coupled to the data redundancy module 304. The data redundancy module 304 is further coupled to the OTU 102(a) via a communication link 106(a). The data redundancy module 304 is also coupled to the OTU 102(d) via a communication link 108(b). The data redundancy module 304 is further coupled to a combiner/splitter 110(b) via a communication link 114(b). All of the link controller modules 104(a)-(d) in FIG. 2 do not require the entire functionality of the link controller 104(a) described in FIG. 3 when maintaining data integrity when a non-hardware failure occurs in the communication link network 100. However, for a failure of an active OTU, the corresponding standby OTUs requires the functionality of the failed active OTU. For simplicity, a configuration for the link controller 104 that can be used for each of the link controller modules 104(a)-(d) in FIG. 1 is shown.

The data redundancy module 304 is configured to provide protection to the communication link network 100 for transmission errors. For example, the data redundancy module 304 provides either the data from the OTU 102(d) or the data from the OTU 102(a) to the combiner/splitter module 110(b) should a transmission error occur along a communication link between the network A 112(a) and the network B 112(b). The combiner/splitter module 110(b) provides the data received from the OTU 102(b) to the network B 112(b). The data redundancy protection will be described with respect to FIG. 10.

The protection unit module 302 comprises a control module 306, a management/data message module 308, and a protection unit module protocol 310. The protection unit module 302 is configured to detect hardware failures within the communication link network 100 and switch the designations of the OTUs between active and standby if required.

The protection unit protocol module 302 determines which OTUs are active and which are standby by monitoring the status and/or management messages. The determination of which OTUs are active is independent of which communication link is the primary link. If a hardware failure occurs in an active OTU, the roles of that OTU and the OTU associated with the failed OTU are switched. Changing roles between OTUs can result in data loss. It is preferable to minimize the changing of roles between OTUs.

The management data message module 308 is configured to transmit and receive management and data messages between OTUs, for example, OTUs 102(b) and 102(d) in FIG. 2. In this way, OTUs monitor the operational status of the other OTUs. For example, the management/data message module 308 in the link controller 104(b) of FIG. 2 allows the link controller 104(b) to monitor the operational status of the OTU 102(d) by transmitting and receiving messages via the communication link 108(b). The link controller 104(b) can further monitor the operational status of the OTU 102(d) via status and/or management messages that are transmitted and received over the communication links 106(a), 108(a) and 106(b).

Each control module 306 is configured to monitor the messages transmitted and received between the management/data message modules 308 within the communication link network 100. If one or more messages between the protection units 302 indicates that a failure has occurred, the control module 306 for the failed OTU can change its status, as well as the status of the OTU that it communicates with via the communication link 108(a) or 108(b). Alternatively, the control module 306 for the non-failed OTU changes the status of the failed OTU and the OTU that it communicates with via the communication link 108(a) or 108(b).

The protection unit protocol module 310 comprises rules for selecting and changing a state for each OTU based on the status and/or management messages transmitted and received between the mgmt/data message modules. The control module 306 applies the rules of the protection unit protocol 310 to determine whether the status of the OTU should be changed. For example, the control module 306 selects between the standby state and the active state for its OTU. An initialization state is also available to the control module 306 for an OTU that is initially activated. These three states are shown graphically in FIG. 4.

Figure 4:
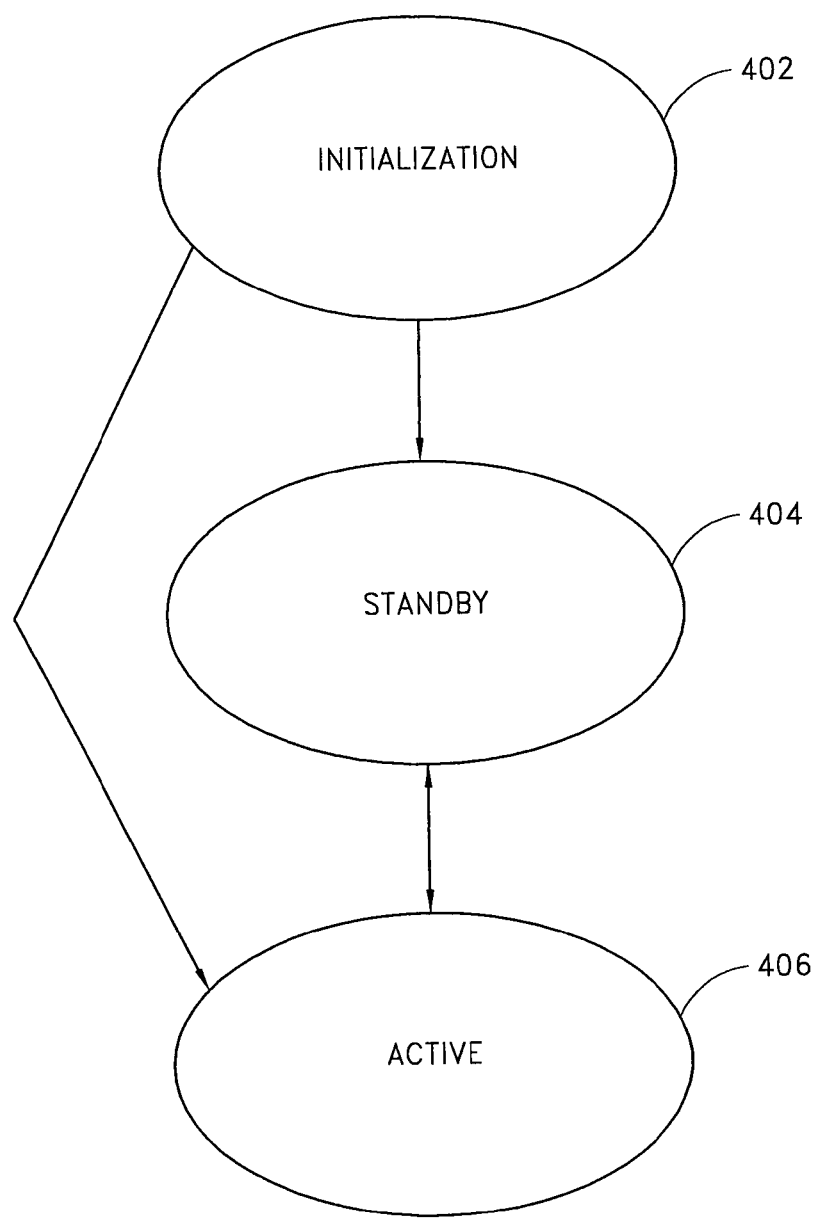
FIG. 4 is a state diagram for each optical transceiver unit (OTU) from FIG. 1.

FIG. 4 is a state diagram for each OTU 102 from FIG. 1. The control module 306 in the protection unit 302 selects an initialization state 402, a standby state 404, or an active state 406 for its OTU. During the initialization state 402 there are parameters the are user configurable for the OTUs 102. Once initialized, two of the OTUs in the network 100 enter an active state 406. The other two OTUs enter the standby state 404. Should a failure occur, the protection unit 302 can change the state of the OTU to compensate for such failure. For example, the active OTUs 102(a), (b) in FIG. 2 could change state from active to standby if the status and/or management messages received by their mgmt/data message modules 308 indicates that a hardware failure has occurred. The control module 306 applies the rules from the protection unit protocol 310 to determine whether the states of the OTUs are changed. An example of such a failure will now be described with reference to FIG. 5.

Figure 5:
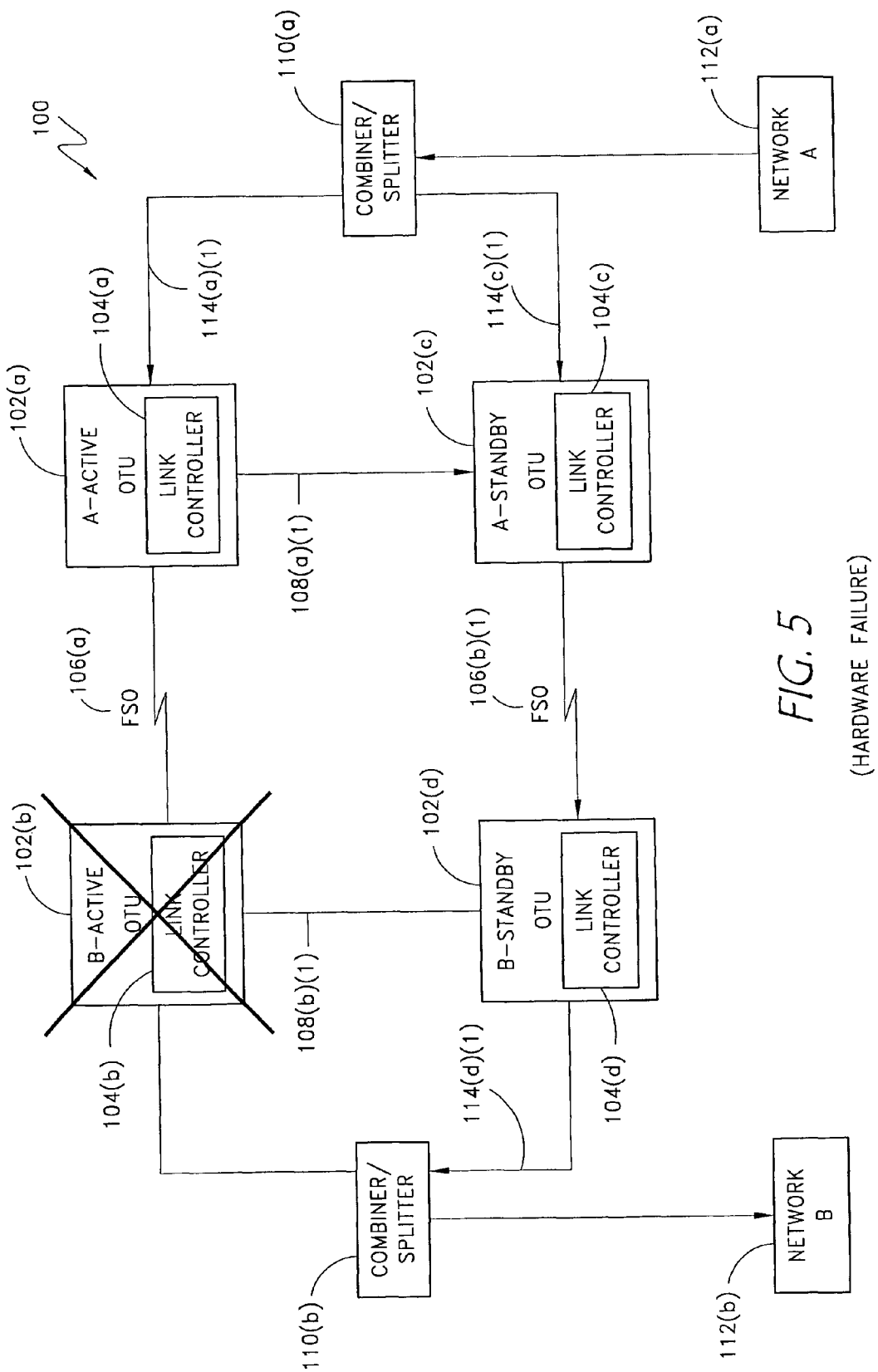
FIG. 5 shows the data flow path from network A to network B through the communication link network of FIG. 1 when OTU 102(b) is not operational.

FIG. 5 shows the data flow path from the network A 112(a) to the network B 112(b) through the communication link network 100 of FIG. 1 when the OTU 102(b) is not operational. In response to the failure of the OTU 102(b), the protection unit module 302 in the link controller 104(b) changes the state of the OTUs 102(b), (d). The OTU 102(d) moves from the standby state to the active state. The non-operational OTU 102(b) changes to the standby state.

Since all of the communication links are bi-directional, each communication link includes an outgoing communication path from an OTU 102(a)-(d) and an incoming communication path to the same OTU. For ease of description, only one of the two paths is shown for the communication links used in FIG. 5. For example, the outgoing path of the communication link 106(b) from the OTU 102(c) to the OTU 102(d) is shown as communication link 106(b)(1). Since FIG. 5 shows the data now path from the network A 112(a) to the network B 112(b), the incoming path of the communication link 106(b) is not shown.

The combiner/splitter module 110(a) forwards the data from the network A 112(a) to the OTU 102(a) via a communication link 114(a)(1) and to the OTU 102(c) via a communication link 114(c)(1). The OTU 102(a) then transmits the data via a communication link 106(a)(1) and a communication link 108(a)(1). Even though the OTU 102(c) also receives the data from the combiner/splitter module 110(a), the OTUs 102(c), while in the standby state, does not forward the data.

The link controller module 104(c) in the OTU 102(c) receives the data from the OTU 102(a) via the communication link 108(a)(1). The link controller module 104(c) in the OTU 102(c) transmits the received data over the communication link 106(b)(1) to the OTU 102(d).

The link controller module 104(d) is configured to monitor the quality of the data received via the communication link

106(*b*)(1). However, the link controller module 104(*d*) does not receive data over the communication link 108(*b*)(2). The link controller 104(*d*) provides the data from the OTU 102(*c*) to the combiner/splitter module 110(*b*) via the communication link 114(*d*)(1). The combiner/splitter module 110(*b*) provides the data received from the OTU 102(*d*) to the network B 112(*b*) via the communication link 114(*d*)(1). In this way, the link between the network A and network B is not lost.

Figure 6:
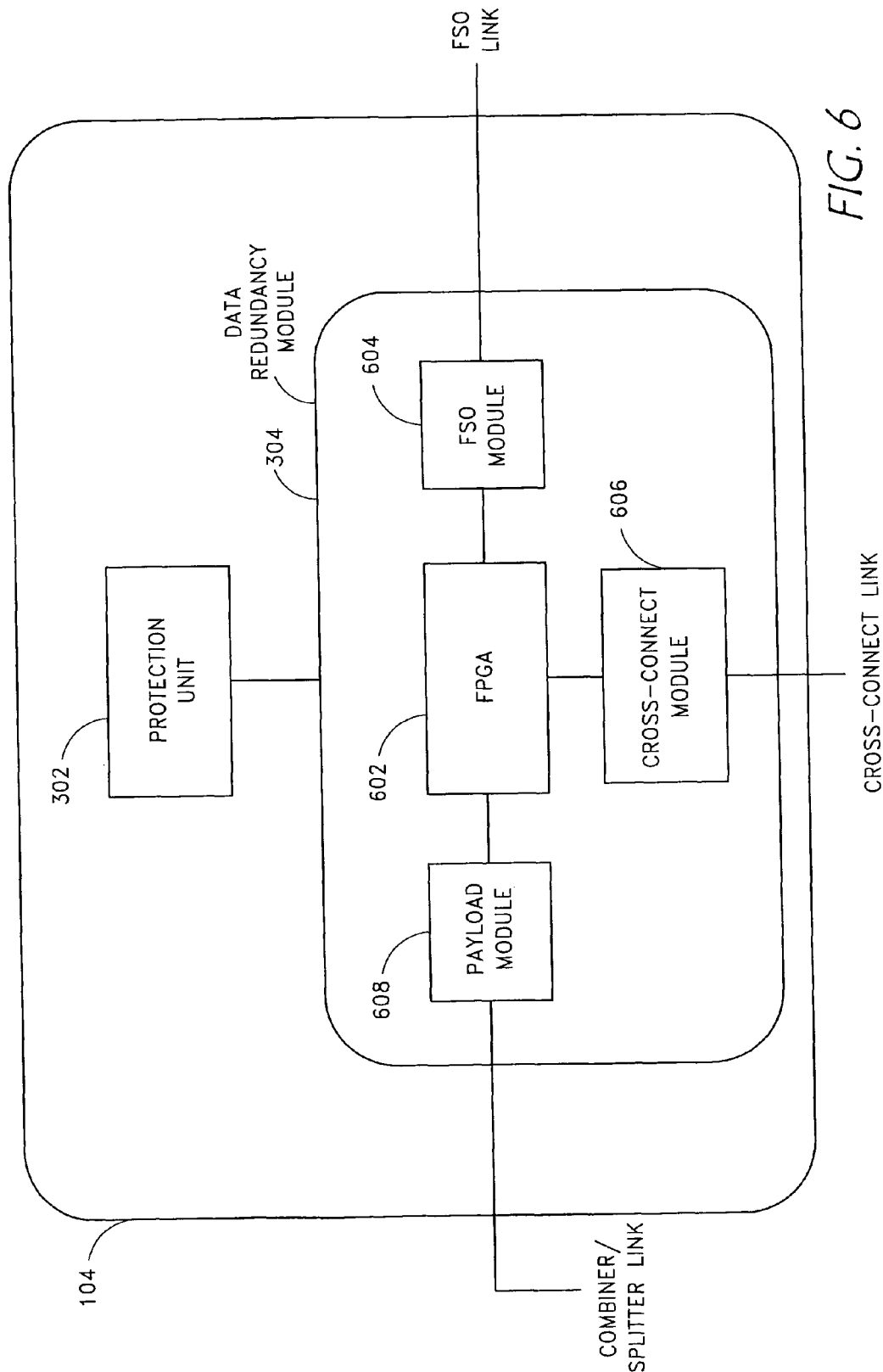
FIG. 6 is a block diagram of the link controller module from FIG. 1 showing the data redundancy module.

FIG. 6 is a diagram of the link controller module 104(*b*) from FIG. 1 showing the data redundancy module 304 and the protection unit 302. The protection unit module 302 is coupled to the data redundancy module 304. The protection unit module 302 operates as described with reference to FIG. 3 in response to a hardware failure in the communication link network 100.

The data redundancy module 304 includes a receive/transmit module which can be implemented as a field programmable gate array (FPGA) 602, a communication link module 604, a communication link module 606, and a payload module 608. The FPGA 602 is coupled to the communication link module 604, the communication link module 606, and the payload module 608. The communication link module 604 is further coupled to the communication link 106(*a*). The communication link 606 is also coupled to the OTU 102(*d*) via the communication link 108(*b*). The payload module 608 is further coupled to the combiner/splitter 110(*b*) via the communication link 114(*b*). All of the link controller modules 104 (*a*)-(*d*) in FIG. 2 do not require the entire functionality of the link controller 104(*a*) described in FIG. 6 when maintaining data integrity when a non-hardware failure occurs in the communication link network 100. For simplicity, a universal configuration for the link controller 104, which can be used for each of the link controller modules 104(*a*)-(*d*) in FIG. 1, is depicted.

The data redundancy module 304 is configured to provide protection to the communication link network 100 when a non-hardware failure occurs. For example, the data redundancy module 304 in the OTU 102(*b*) provides either the data from the OTU 102(*d*) or the data from the OTU 102(*a*) to the combiner/splitter module 110(*b*) should a non-hardware failure occur along a communication link between the network A 112(*a*) and the network B 112(*b*). The combiner/splitter module 110(*b*) provides the data received from the OTU 102(*b*) to the network B 112(*b*).

The payload module 608 is configured to frame incoming data and deframe outgoing data. In adapting the data for transmission, the payload module 608 formats the data for its transmission. The payload module 608 allows the communication link network 100 to interface with the network B without regard to the transmission protocol employed by networks A and B.

The communication link module 606 is configured to communicate data between the active OTU 102(*b*) and the standby OTU 102(*d*) via the communication link 108(*b*).

The FPGA 602 is configured to determine whether the incoming data received from the communication link 106(*a*) and the communication link 108(*b*) is valid or error free. The FPGA 602 is further configured to select between both data streams. One embodiment of the data redundancy module 304 will be described with reference to FIG. 7.

Figure 7:
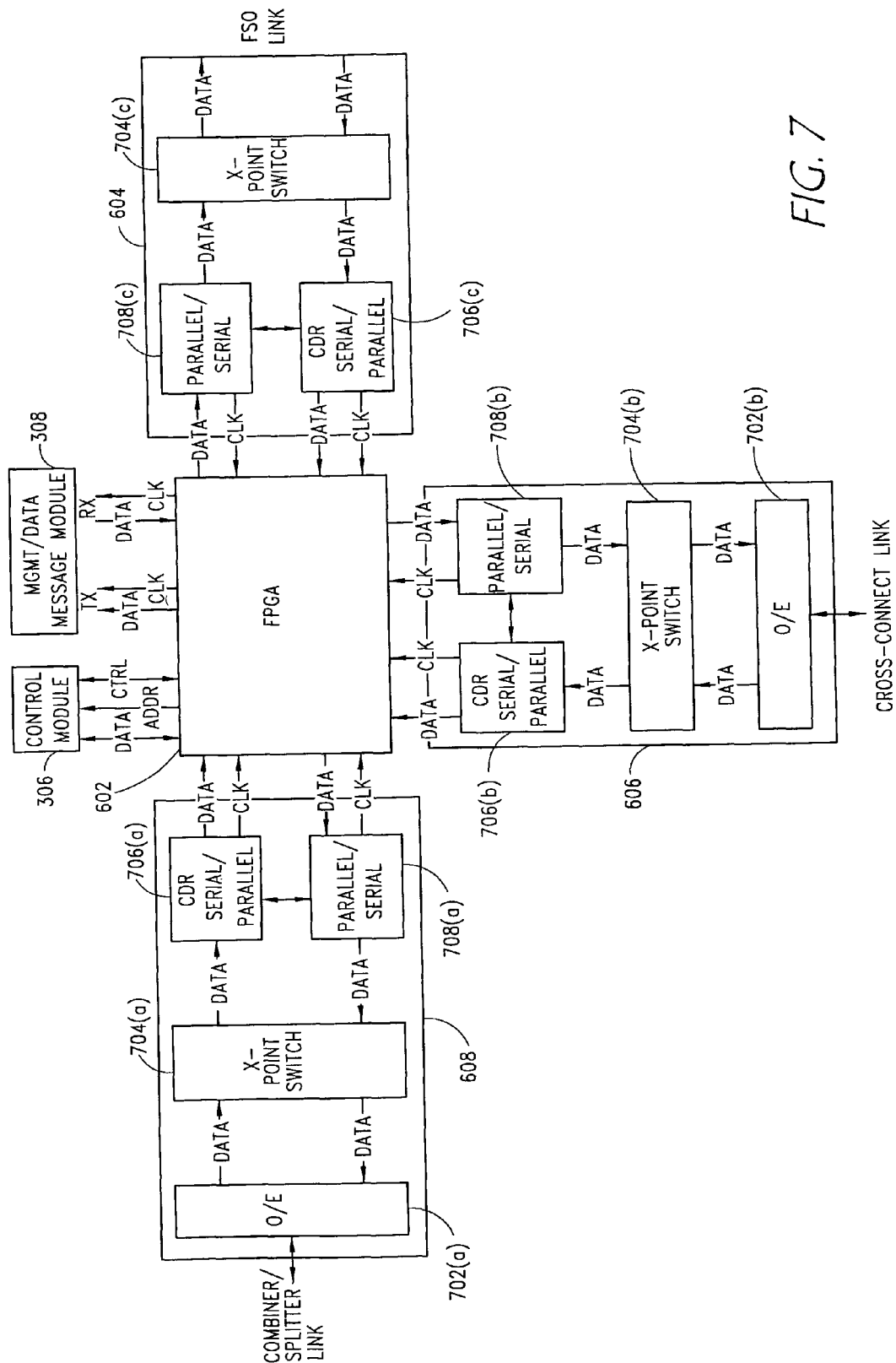
FIG. 7 is a detailed diagram of the payload module, the module, and the cross-connect module, all from FIG. 6.

FIG. 7 is a more detailed diagram of the payload module 608, the module 604, and the cross-connect module 606, all from FIG. 6.

The payload module 608 comprises an optical/electrical (O/E) module 702(*a*), an X-point switch 704(*a*), a CDR serial/parallel module 706(*a*), and a parallel/serial module 708(*a*). The O/E module 702(*a*) communicates data between the combiner/splitter module and the X-point switch 704(*a*). The X-point switch 704(*a*) further communicates with the CDR serial/parallel module 706(*a*) and the parallel/serial module 708(*a*). The CDR serial/parallel module 706(*a*) and the parallel/serial module 708(*a*) further communicate with one another as well as the FPGA 602.

The cross-connect module 606 comprises an optical/electrical (O/E) module 702(*b*), an X-point switch 704(*b*), a check data recovery (CDR) serial/parallel module 706(*b*), and a parallel/serial module 708(*b*). The O/E module 702(*a*) communicates data between the cross-connect link 108 and the X-point switch 704(*b*). The X-point switch 704(*b*) further communicates with the CDR serial/parallel module 706(*b*) and the parallel/serial module 708(*b*). The CDR serial/parallel module 706(*b*) and the parallel/serial module 708(*b*) further communicate with one another as well as the FPGA 602.

The FSO module 604 comprises an X-point switch 704(*c*), a CDR serial/parallel module 706(*c*), and a parallel/serial module 708(*c*). The X-point switch 704(*c*) communicates data between the FSO link 106 and the CDR serial/parallel module 706(*c*) and the parallel/serial module 708(*c*). The CDR serial/parallel module 706(*c*) and the parallel/serial module 708(*c*) further communicate with one another as well as the FPGA 602.

The O/E modules 702(*a*)-(*b*) are configured to convert incoming and outgoing signals for optical and electrical transmission via their respective communication links. The X-point switches 704(*a*)-(*c*) are configured to switch between forwarding incoming data to the CDR serial/parallel modules 706(*a*)-(*c*) and receiving outgoing data from the parallel/serial module 708(*a*)-(*c*). The X-point switches 704(*a*)-(*c*) are further configured to loop incoming management messages received from the O/E modules 702(*a*)-(*b*) back to the O/E modules 702(*a*)-(*c*). The management message is then transmitted back to the originating OTU 102 to allow the sending OTIS to monitor the status of the communication link.

The CDR serial/parallel modules 706(*a*)-(*c*) convert the incoming serial data stream to a parallel stream for processing by the FPGA 602. The bus width of the FPGA 602 can vary. For example, the CDR serial/parallel 706(*a*)-(*c*) can convert the incoming serial bit stream into 16 bit wide bytes. The CDR serial/parallel modules 706(*a*)-(*c*) are also configured to perform clock recovery for the serial data stream.

The parallel/serial modules 708(*a*)-(*c*) convert the outgoing parallel data stream to a serial stream for transmission over the communication links. The bus width of the FPGA 602 can vary. For example, the parallel/serial modules 708 (*a*)-(*c*) can convert the 16 bit wide bytes into a serial bit stream. The parallel/serial modules 708(*a*)-(*c*) provide the serial bit stream to the X-point switches 704(*a*)-(*c*), respectively.

As shown in FIG. 7, the control module 306 and the FPGA 602 share data address and control information. The management/data message module 308 and the FPGA module 602 share data and clock message information.

Figure 8:
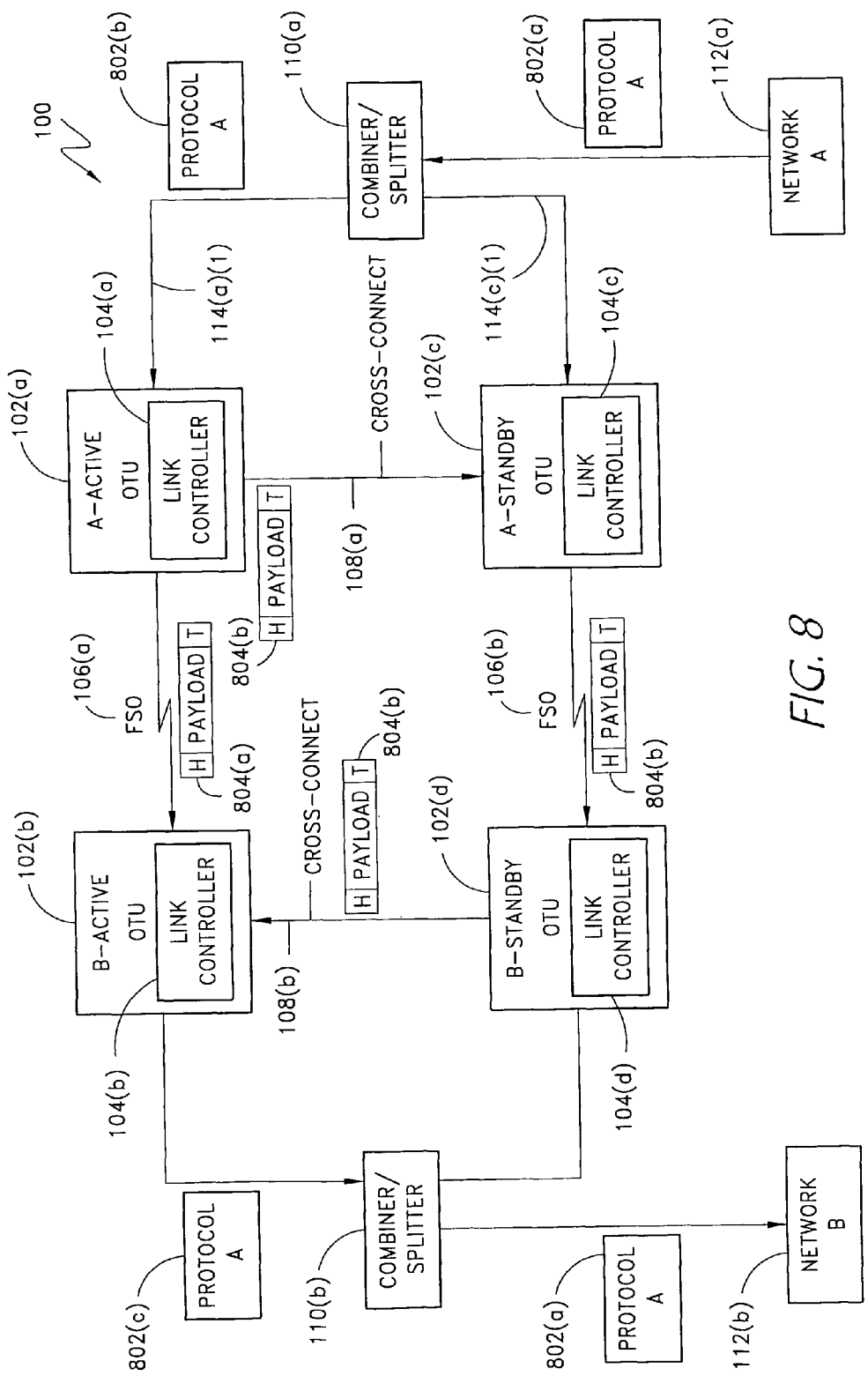
FIG. 8 is a diagram of the communication link network from FIG. 2 incorporating a superframe protocol for formatting communications between OTUs 102(a)-(d).

FIG. 8 is a diagram of the communication link network 100 from FIG. 2 incorporating a superframe protocol for formatting communications between OTUs 102(*a*)-(*d*). The superframe protocol is an example of the frame type described above. The components shown in FIG. 8 operate as described in FIG. 2.

The communication link network 100 utilizes a frame or protocol that is independent of the protocol utilized by network A 112(*a*) and network B 112(*b*). In the exemplary communication link network 100 of FIG. 8, the network A 112(*a*) utilizes protocol A 802(*a*) to exchange data with network B. Data formatted in protocol A 802(*a*) is transmitted by network A 112(*a*) to the combiner/splitter module 110(*a*). The combiner/splitter module 110(*a*) receives the data formatted in the protocol A 802(*a*) and forwards the data to the OTU 102(*a*). The link controller 104(*a*) receives a bit stream representing data, takes protocol A, and inserts it or packs it within a superframe 804(*b*). Management and/or status messages can also be inserted in the superframe 804(*b*). The superframe 804(*b*) comprises the payload, a header, and a trailer. An exemplary superframe 804(*b*) will be described with reference to FIG. 9.

The link controller module 104(*a*) transmits the superframe 804(*b*) via the communication link 106(*a*)(1). The link controller 104(*a*) also transmits the superframe 804(*b*) to the OTU 102(*c*) via the communication link 108(*a*)(1). The OTU 102(*c*) receives the superframe 804(*b*) and transmits the superframe 804(*b*) to the OTU 102(*d*). The OTU 102(*d*) transmits the superframe 804(*b*) to the OTU 102(*b*) via the communication link 108(*b*)(1). The link controller 104(*b*) selects between the superframe 804(*a*) and the superframe 804(*b*) for forwarding to the combiner/splitter 110(*b*)(1). The payload from the selected superframe is converted by the link controller module 104(*b*) back into a bit stream data in protocol A 802(*a*). The data, which is in the protocol A 802(*a*), is transmitted to the combiner/splitter module 110(*b*) for forwarding to the network B 112(*b*).

In one embodiment, the transmission rate of the superframes 804(*a*), 804(*b*) within the communication link network 100 can be increased above the transmission rate for the networks A and B thereby compensating for any delay introduced by the superframing.

Figure 9:
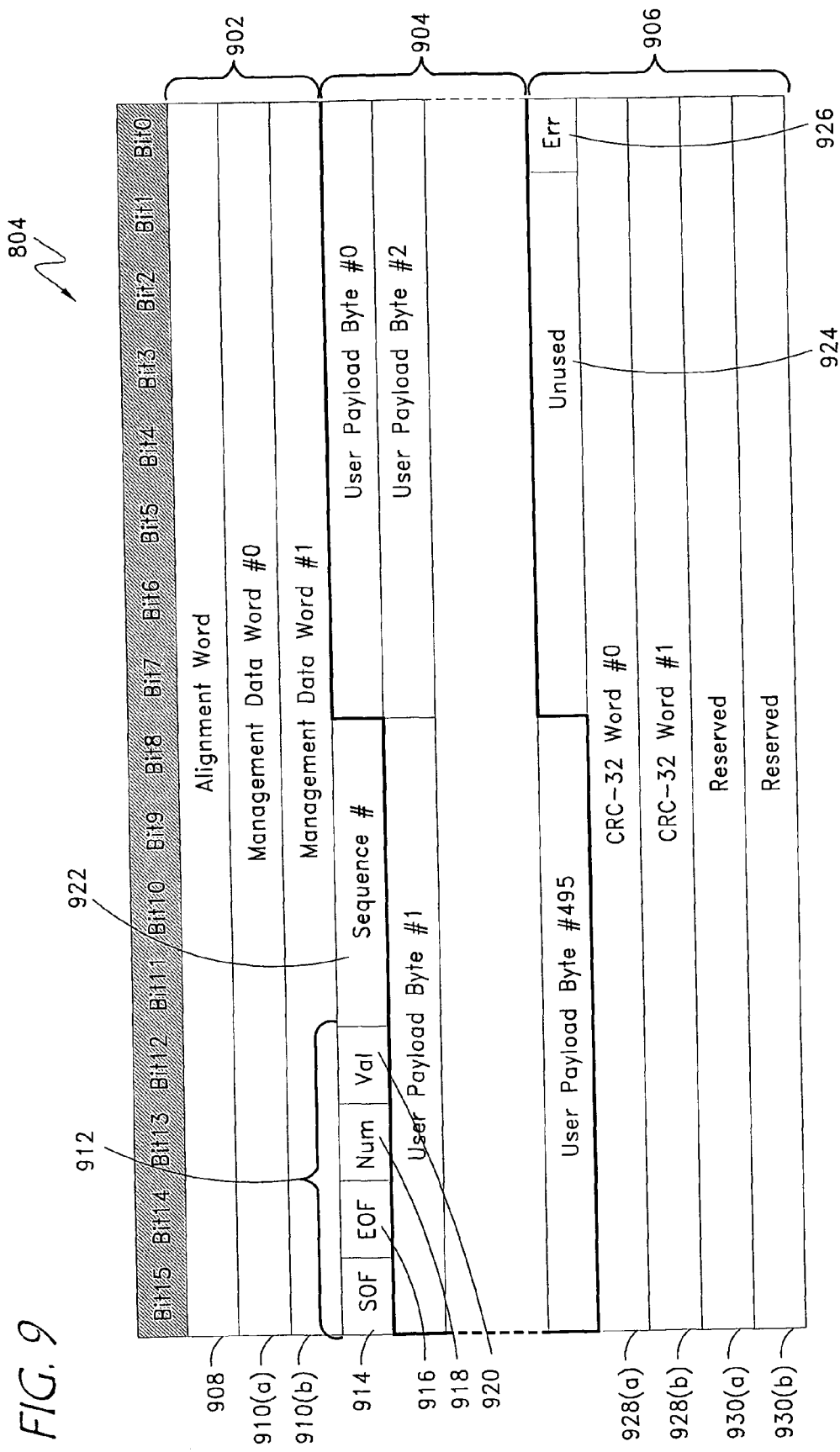
FIG. 9 is an illustration of one embodiment of the superframe protocol from FIG. 8.

FIG. 9 is an illustration of one embodiment of the superframe 804. The superframe 804 includes a header section 902, a payload section 904, and a trailer section 906. The superframe 804 is utilized by the communication link network 100 to transmit data and management messages between the OTUs 102.

The header section 902 can include an alignment word 908 and one or more management data words 910(*a*)-(*b*). The management data words 910 are used by the OTUs to monitor the condition of the OTUs 102. The management data words 910 can further be used to send instructions through the network 100 to change the operational state of the OTUs 102 as described with reference to FIG. 4. The header section 902 further includes a control section 912. The control section 912 can include a start of frame bit 914 and end of frame bit 916, a number bit 918, and a valid data bit 920. The start of frame bit 914 identifies where the payload section 904 begins within the superframe 804. The end of frame bit 916 indicates where the payload section 904 ends within the superframe 804. The valid bit 920 indicates whether there is management data in the received superframe 804.

The header section 902 further includes a sequence number 922. The sequence number 922 is assigned by the active OTU that is framing the payload data in a superframe 804. For example, the sequence number 922 is assigned to the superframe 804(*a*) and to the superframe 804(*b*) by the OTU 102(*a*) of FIG. 8. By assigning the same sequence number 922 to the superframe 804(*a*) and the superframe 804(*b*), the OTU 102(*b*) is able to correlate the superframes received via the communication link 106(*a*)(1) and the communication link 108(*b*)(1).

The payload section 904 can be divided into user payload bytes as shown in FIG. 9. For example, the user payload bytes in FIG. 9 have lengths of 8 bits.

The trailer section 906 includes an unused section 924, an error section 926, error correction words 928(*a*)-(*b*), and two reserved 16-bit words 930(*a*)-(*b*). The error section 926 is used by each receiving OTU 102 to identify the superframe 804 as having valid or invalid data. The first OTU 102 that identifies the data as invalid in a given superframe 804 sets the bit to "1". A bit set to "1" indicates to a subsequently receiving OTU 102 that the superframe 804 has been identified as including invalid data. For example, if the superframe 804(*b*) is identified as including invalid data by the OTU 102(*c*) of FIG. 8, the OTU 102(*c*) would set the bit to "1" in the error section 926 of the superframe 804(*b*). The superframe 804(*b*) is then transmitted via the communication link 106(*b*)(1) to the OTU 102(*d*). The OTU 102(*d*) would re-check the data, for example, using the CRC, within the superframe 804(*b*) to determine whether the superframe 804(*b*) contained invalid data. However, even if the OTU 102(*d*) identified only valid data within the superframe 804(*b*), the error section 926 bit would not be changed. Similarly, the OTU 102(*b*) would not change the error section bit 926 if upon receiving the superframe 804(*b*), it determined that no errors were present within the superframe 804(*b*).

The OTU 102(*b*) reads the error section bit 926 within the received superframe 804(*b*) from the current primary communication link which is either communication link 106(*a*)(1) or communication link 108(*b*)(1). If the error section bit 926 is set to 0 for the primary communication link, the OTU 102(*b*) selects the superframe 804 from the primary communication link. If the error bit section 926 is set to "1", the OTUs 102(*b*) checks the error section bit 926 for the superframe 804 received via the non-primary communication link that has the same sequence number 922 as the superframe received via the primary communication link. If the error section bit 926 is set to "0" for the non-primary communication link, the OTU 102(*b*) selects the superframe 804 from the non-primary communication link. The error correction words 928(*a*)-(*b*) are used by the OTUs 102 to determine whether errors are present within the superframe 804.

Figure 10:
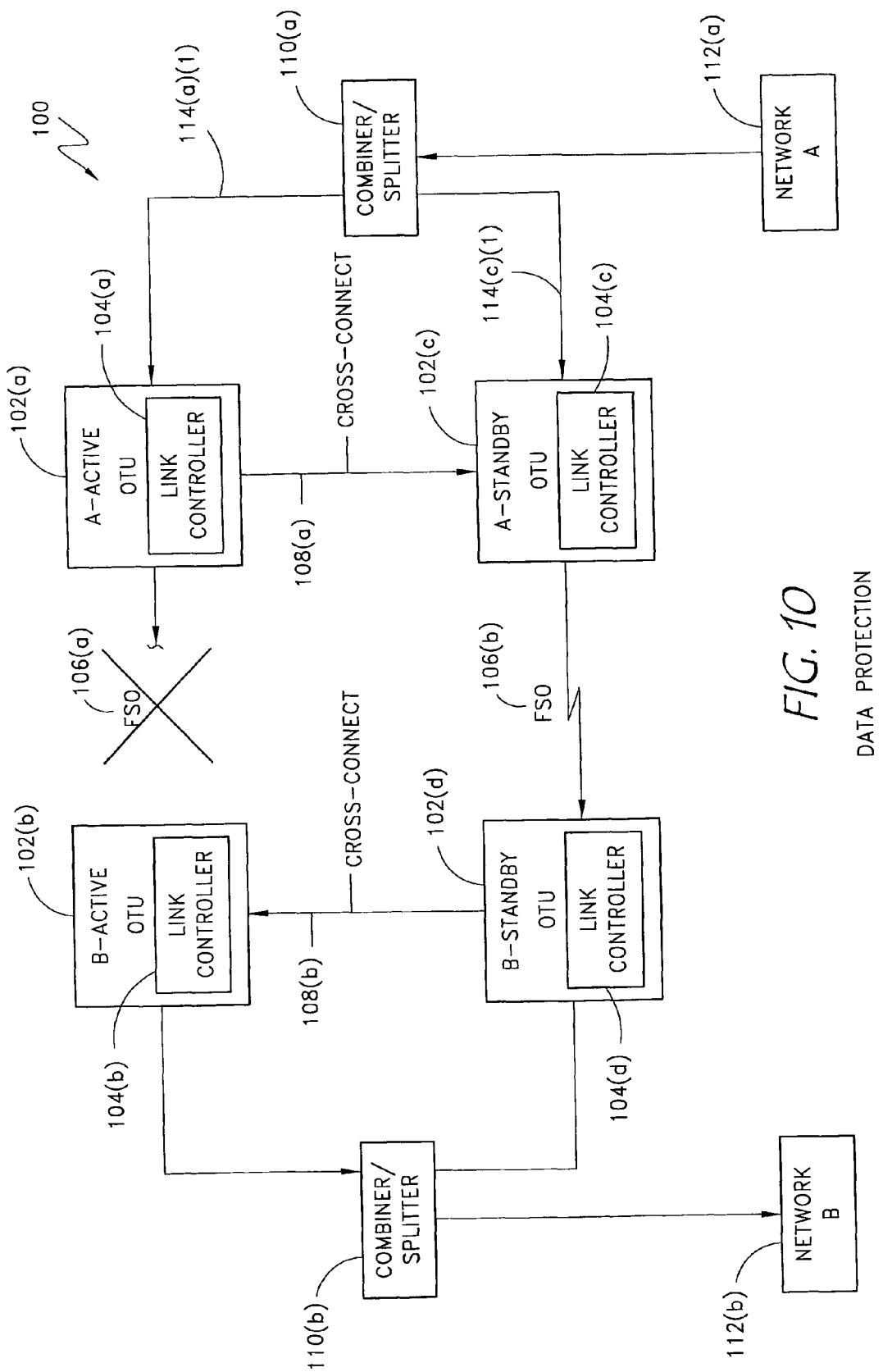
FIG. 10 shows the data flow path from network A to network B through communication link network of FIG. 1 when the primary link 106(a) is blocked.

FIG. 10 shows the data flow path from the network A 112(*a*) to the network B 112(*b*) through the communication link network 100 when the communication link 106(*a*) is blocked. In contrast to the failure scenario described with reference to FIG. 5, FIG. 10 illustrates the scenario where the primary link 106(*a*) is temporarily blocked and is independent of the operational status of the components of the communication link network 100.

The components illustrated in FIG. 10 are identified and operate as described with reference to FIG. 2. Since all of the communication links are bi-directional, each communication link includes an outgoing communication path from an OTU 102(*a*)-(*d*) and an incoming communication path to the same OTU. For ease of description, only one of the two paths is shown for the communication links used in FIG. 10. For example, the outgoing path of the communication link 106(*b*) from the OTU 102(*c*) to the OTU 102(*d*) is shown as communication link 106(*b*)(1). Since FIG. 10 shows the data flow path from the network A 112(*a*) to the network B 112(*b*), the incoming path of the communication link 106(*b*) is not shown.

The combiner/splitter module 110(*a*) forwards the data from the network A 112(*a*) to the OTU 102(*a*) via a communication link 116(*a*)(1). The OTU 102(*a*) then transmits the data via a communication link 106(*a*)(1) and a communication link 108(*a*)(1). The data transmitted via the communication link 106(*a*)(1) and the data transmitted via the communication link 108(*a*)(1) are the same.

The link controller module 104(*c*) in the OTU 102(*c*) receives the data from the OTU 102(*a*) via the communication link 108(*a*)(1). The link controller module 104(*c*) in the OTU 102(*c*) transmits the received data over the communication link 106(*b*)(1) to the OTU 102(*d*). The OTU 102(*d*) transmits the received data to the OTU 102(*b*) via the communication link 108(*b*)(1).

The data redundancy module 304 in the link controller module 104(*d*) is configured to monitor the quality of the data received via the communication link 106(*b*)(1) and the communication link 108(*b*)(1). Since the communication link 106(*a*)(1) is blocked, the link controller 104(*d*) in the active OTU 102(*d*) determines that the data received from the OTU 102(*a*) is invalid. Since the OTU 102(*b*) also receives data via the communication link 108(*b*)(1), the OTU 102(*b*) provides the data packet to the combiner/splitter module 110(*b*) that was received via the communication link 108(*b*)(1) that corresponds to the data that was blocked. In this way, the OTU 102(*b*) is able to provide the payload data that was blocked via the primary link 106(*a*)(1) to the network B 112(*b*). The OTU 102(*b*) can then continue to provide the data received via the communication link 108(*b*)(1) to the combiner/splitter 110(*b*) until the data received via the communication link 108(*b*)(1) is invalid. The redundancy module 304 designates the communication link 108(*b*)(1) as the primary link. The blocked link 106(*a*)(1) changes to the non-primary link.

If the data received via the communication link 108(*b*)(1) is not error free and invalid, the OTU 102(*b*) selects the data received via the link 106(*a*) that corresponds to the data that is invalid along the communication link 106(*b*)(1). In this way, the OTU 102(*b*) is able to switch between the communication link 106(*a*)(1) and the communication link 108(*b*)(1) to provide a single highly reliable communication link between the network A 112(*a*) and the network B 112(*b*).

Figure 11:
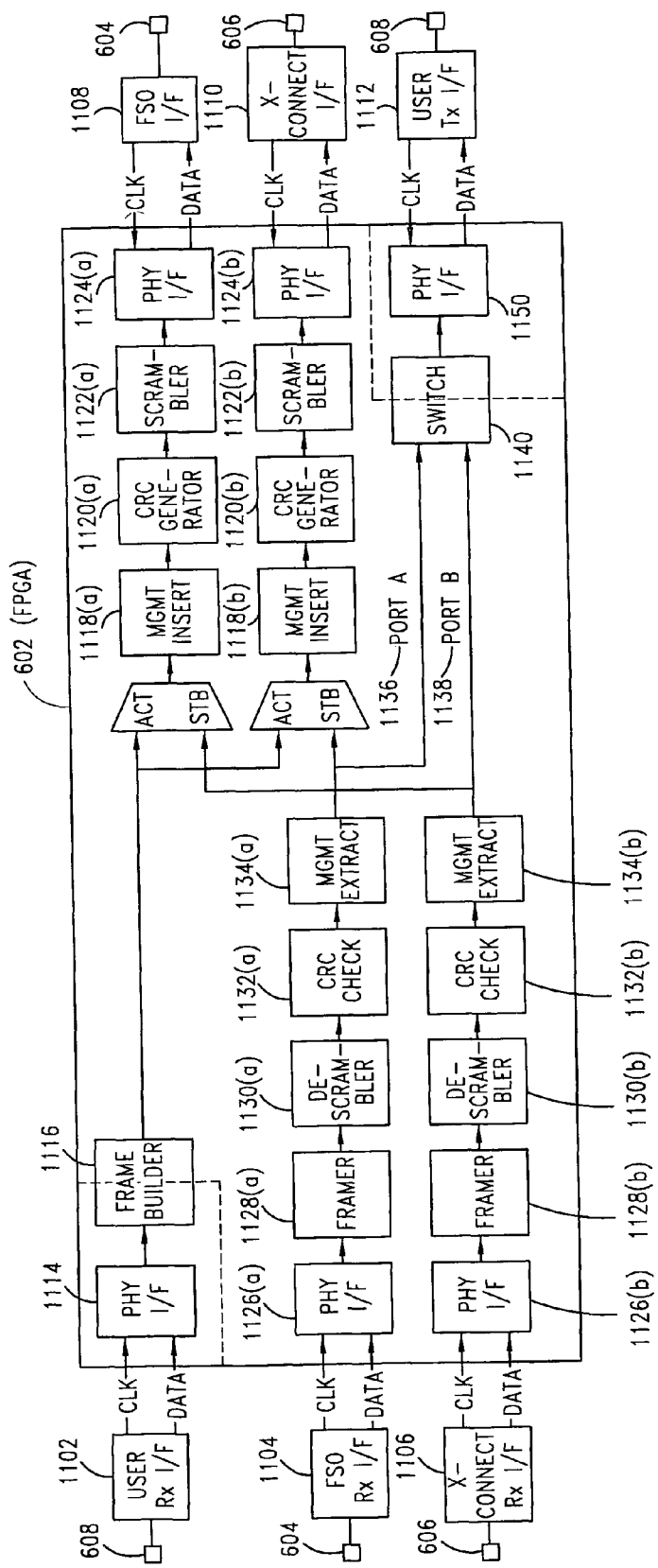
FIG. 11 is a diagram of one embodiment of the field programmable gate array (FPGA) from FIG. 6.

FIG. 11 is a diagram of one embodiment of the FPGA from FIG. 6. FIG. 11 further shows the interfaces between the payload module 608, the module 604, and the cross-connect module 606, all from FIG. 6, interfacing with the FPGA 602. The FPGA 602 illustrated in FIG. 11 is configured for operation in the OTUs 102(*a*)-(*d*) in FIG. 6. Thus, the FPGA 602 of FIG. 11 is a universal FPGA that can be configured for operation as any of the four OTUs shown in FIG. 6.

The FPGA 602 comprises PHY interface (I/F) 1114, PHY I/F 1126(*a*)-(*b*), frame builder 1116, interface framer modules 1128(*a*)-(*b*), descrambler modules 1130(*a*)-(*b*), cyclic redundancy checking (CRC) (error detection) check modules 1132(*a*)-(*b*), mgmt extract modules 1134(*a*)-(*b*), mgmt insert modules 1118(*a*)-(*b*), CRC generator modules 1120(*a*)-(*b*), scrambler modules 1122(*a*)-(*b*), switch 1140, PHY I/F 1124(*a*)-(*b*), and PHY I/F 1150. The operation of the switch 1140 will be described with reference to FIG. 12.

The flow of data through the FPGA 602 is principally from the left to the right in FIG. 11. The data flow through the FPGA 602 for each OUT 102(*a*)-(*d*) is described with reference to FIGS. 15-18. Depending on whether the OTU 102 that comprises the FPGA 602 is in an active or standby state, the FPGA 602 can receive data and clock information from one or more of three input sources. The first source is a user RX interface 1102 which connects via the payload module 608. The second source is an FSO Rx I/F 1104 which connects via the module 604. The third source is a cross-connect RX I/F 1106 which connects via the cross-connect module 606.

Depending on whether the OTU 102 that comprises the FPGA 602 is in an active or standby state, the FPGA 602 can transmit data and clock information to one or more of three outputs. The first output is a user TX interface (I/F) 1112 which connects via the payload module 608. The second output is an FSO I/F 1108 which connects via the module 604. The third output is a cross-connect I/F 1110 which connects via the cross-connect module 606.

Figure 12:
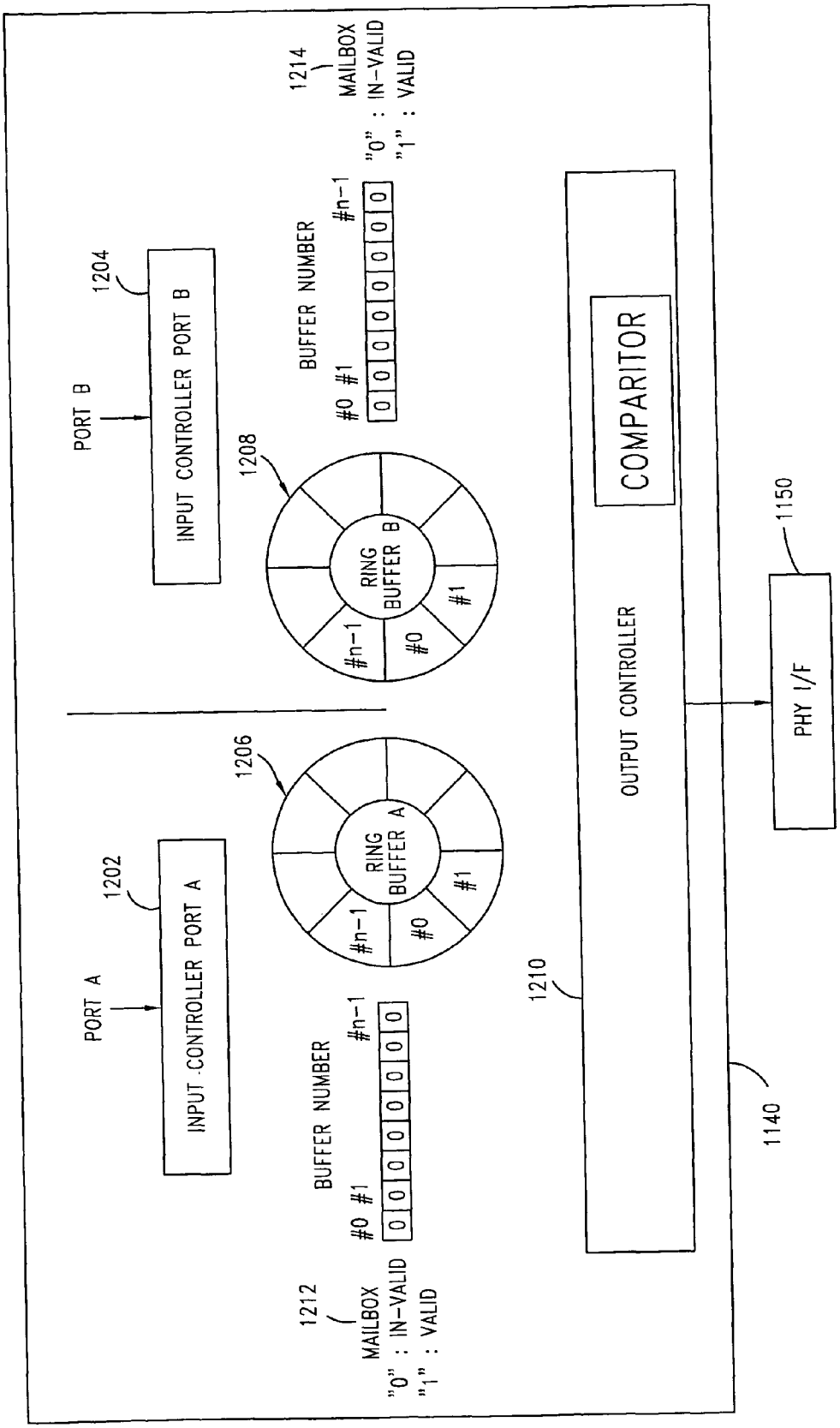
FIG. 12 is a diagram of the switch from FIG. 11.

FIG. 12 is a diagram of the switch 1140 from FIG. 11. The switch 1140 is configured to select between data received via Port A 1136 and the Port B 1138 for forwarding to the network B 112(*b*). The switch 1140 comprises an input controller Port A 1202, an input controller Port B 1204, a ring buffer A 1206 with an associated mailbox A 1212, a ring buffer B 1208 with an associated mailbox 1214, and an output controller 1208.

The input controllers 1202, 1204 are configured to load/stage their associated buffers 1206, 1208 from data received via the Ports A 1136 and B 1138, respectively. In one embodiment, this process occurs independently on each input controller 1202, 1204. Each ring buffer 1206, 1208 can have N entries. A corresponding mailbox of N bits 1212, 1214 maps directly to the locations within the buffer rings 1206, 1208. The value of a mailbox bit (0 or 1) associated with each buffer location is used to indicate whether the data stored in that buffer location is valid. The sequence number that is embedded into the data packet is used by the input controller to determine which is the next mailbox/ring entry to use. As each new data packet arrives via the Port A 1136 and the Port B 1138, the mailbox entry associated with the next buffer location in the ring buffer is checked to ensure that it is available for storage. If the buffer location is available, the input controller 1202, 1204 writes to that buffer location. If the buffer location is not available, the incoming data packet is discarded.

In one embodiment, the input controller Port A 1202 is further configured to determine whether the received data packet is valid according to the determination of the CRC module 1132 (see FIG. 1). When valid data is written to the buffer location, the mailbox bit 1212 is set to 1. If the data packet is invalid, the input controller Port A 1202 identifies the stored data packet as being invalid in the mailbox 1212 associated with that buffer number. Input controller Port B 1204 in the same manner.

The size of the ring buffers A and B 1206, 1208 is selected such that at least the first transmitted frame will be received in the one buffer before the other buffer is full. In this way, the communication link network 100 is not required to correct for phase delay between the two incoming data packets to the Port A 1136 and the Port B 1138. In the exemplary buffer of FIG. 12, this time period corresponds to four buffer locations. Thus, the buffers include a minimum of four locations. However, each buffer in FIG. 12 includes an exemplary total of eight buffer locations.

The output controller 1210 is configured to select data from either the first or second buffers 1206, 1208. The output controller 1210 is further configured to switch between selecting data from the first and second buffers. The output controller 1210 switches between the two buffers when the data received from the current buffer is not valid. In one embodiment, the output controller 1210 determines whether the data is valid.

The output controller 1210 accesses the data from the first and second buffers so as to provide a single highly reliable communication link. Regardless of whether the first or second buffer is selected by the output controller 1210, the mailbox 1212, 1214 location for both buffers is cleared or set to "0". The location pointer is then incremented. The current buffer is then checked and if it is not valid (i.e. the corresponding mailbox bit is set to 0) then the other buffer is checked. If the other buffer is valid, data from the other buffer will be forwarded to the network B 112(*b*) and the location pointer incremented. The new current buffer for the next sequence number is then checked to see if it is valid. If the data is not valid then the other buffer is checked. The procedure can continue in the same manner. If neither buffer is valid, the initialization criteria is applied. For example, the input controller looks for four back-to-back valid buffers in one of the two ring buffers 1206, 1208. The number of back-to-back buffer locations corresponds to the amount of data that could be transmitted during a time period that corresponds to the difference in delay between data received via the communication link 106(a) and data received via the communication link 108(b). As explained above, in the exemplary switch 120 of FIG. 12, the amount of data corresponds to four buffer locations.

In one embodiment, the output controller 1210 further includes a comparitor module 1220. The comparitor module 1220 is configured to compare the buffered data received from the Ports A and B.

Figure 13:
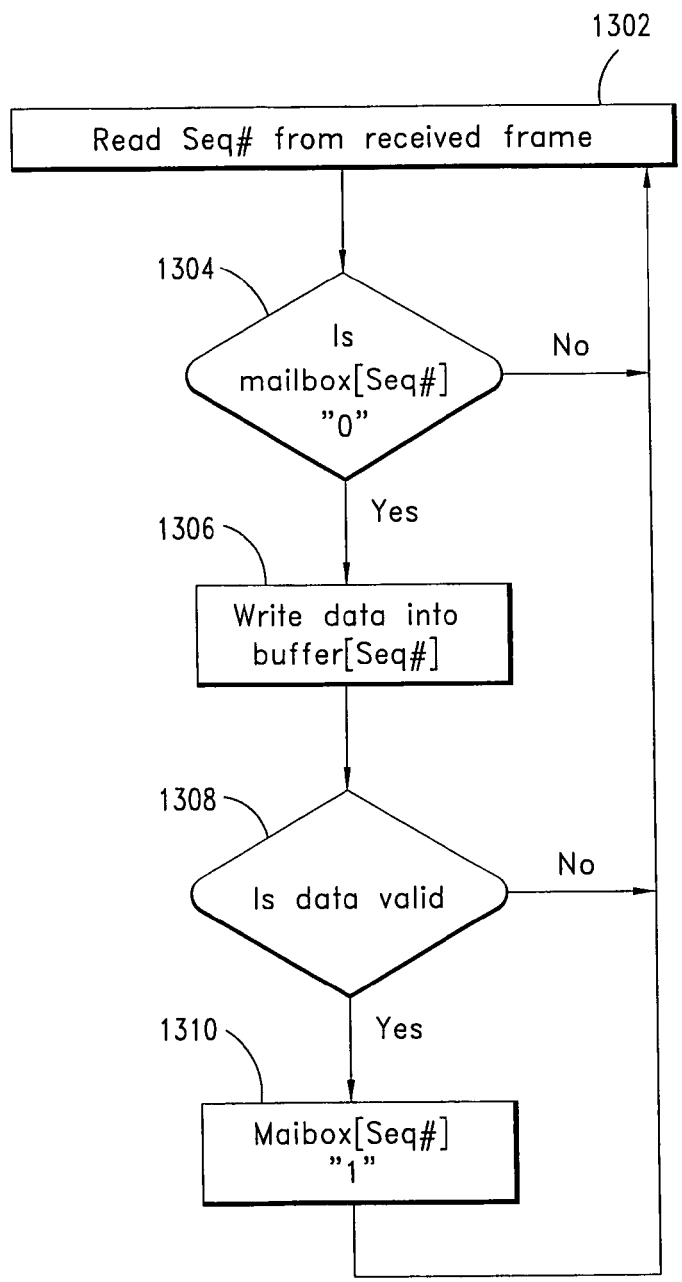
FIG. 13 is a flow diagram of a write process performed by the switch from FIG. 12.

FIG. 13 is a flow diagram of a write process performed independently on each input controller 1202, 1204 by the switch 120. The process begins at a state 1302 where the input controller 1202, 1204 reads the sequence number of the received frame of data. The sequence number (embedded into the data stream by the transmitter) indicates which mailbox/buffer entry to use. The process moves to a decision state 1304 where the input controller determines whether the mailbox associated with the sequence number is set to valid or invalid. As each new data frame arrives, the associated (by sequence number) mailbox entry is checked to ensure that it is empty, or set to "0". If the mailbox bit is valid, or set to "1", the process discards the received frame and returns to the state 1302 as described above.

Returning to the decision state 1304, if the mailbox bit is invalid, the process continues to a state 1306 where the input controller writes the data from the frame to the buffer location associated with the invalid mailbox bit. The corresponding mailbox of N bits maps directly to unique locations within the buffer ring. The value of the bit (0 or 1) indicates the validity of the data in that buffer location for the purposes of forwarding the data. The process moves to a decision state 1308 where the input controller determines whether the stored data is valid. The determination can be made by checking the valid bit 920 (see FIG. 9) in the frame. If the stored data is invalid, the mailbox bit associated with the buffer location remains a "0" signifying that the data is invalid. The process then returns to the state 1302 as described above.

Returning to the decision state 1308, if the stored data is valid, the process moves to a state 1310 where the input controller sets the mailbox bit associate with the valid storage location to "1" signifying that the data is valid. The process then returns to the state 1302 as described above.

Figure 14:
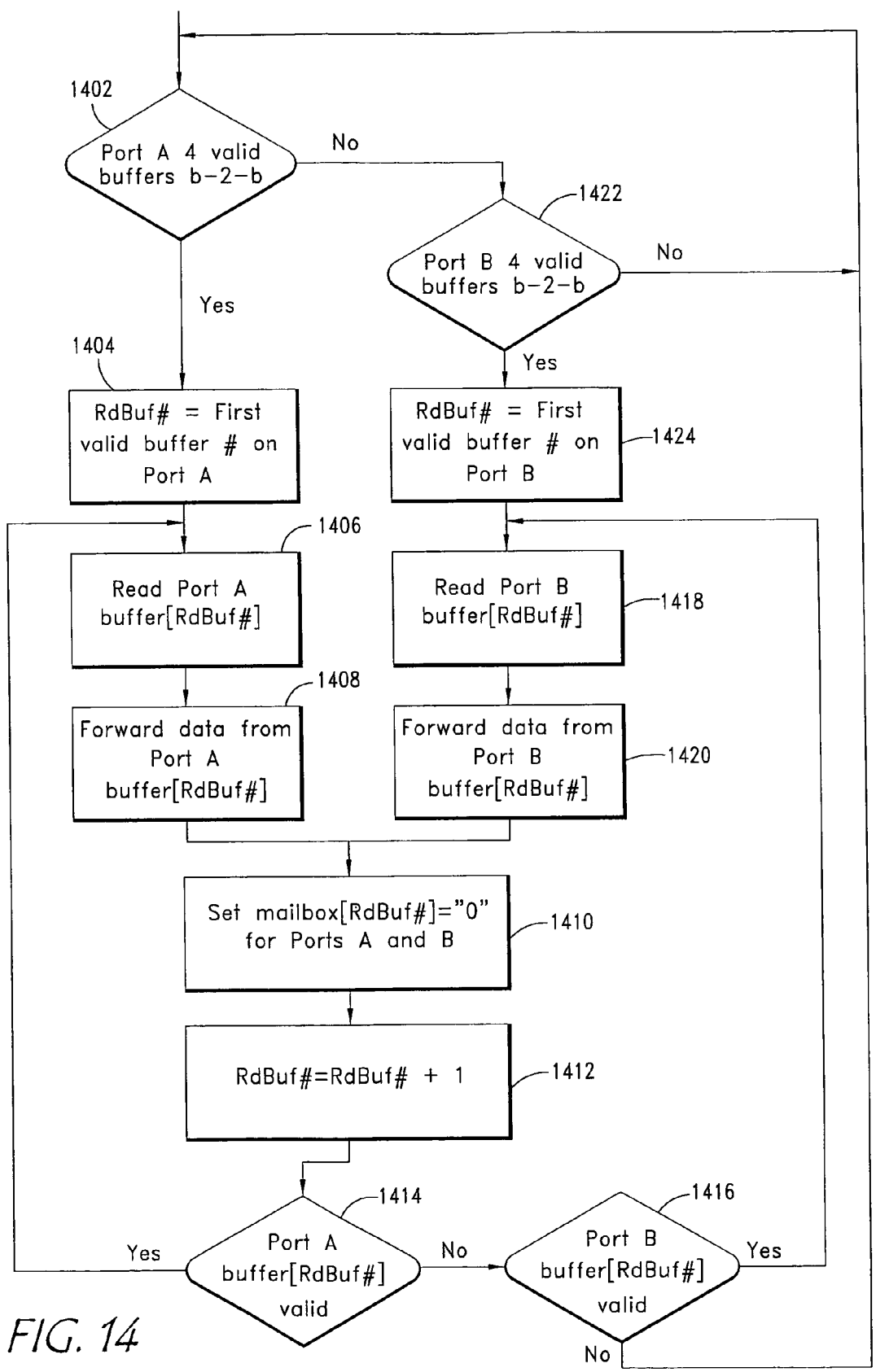
FIG. 14 is a flow diagram of a read process performed by the switch from FIG. 12.

FIG. 14 is a flow diagram of a read process performed by output controller 1208 of the switch from FIG. 12. The process begins at a decision state 1402 where the input controller 1202 determines whether a minimum of N/2 valid back-to-back buffer locations is found in Port A. If Port A satisfies this condition, the process moves to a state 1404 where a location pointer is set to the first valid buffer location on Port A. The process moves to a state 1406 where the buffer is read. The process continues to a state 1408 where the input controller 1136 forwards the buffer to the output controller 1210. The process moves to a state 1410 where the input controller 1202 sets the mailbox bit 1212 associated with the read from buffer to "0". The input controller 1202 also sets the mailbox bit 1214 that corresponds with the mailbox bit 1212 for port B to "0". The process moves to a state 1412 where the buffer location is incremented by one to identify the next buffer location. The process moves to a decision state 1414 where the input controller 1202 checks the validity of the mailbox bit associated with the next buffer location. If the mailbox bit is set to "1" and valid, the process returns to the state 1406 where the input controller reads from the next buffer location. The process then continues as described above.

Returning to the decision state 1414, if the mailbox bit is set to "0" and invalid, the process then moves to a decision state 1416 where the input controller 1204 determines whether the buffer location for Port B that corresponds to the invalid buffer location for Port A is valid. If the buffer location for Port B is invalid and set to "0", the process return to the decision state 1402 as described above. Alternatively, if the buffer location for Port B is valid and set to "1", the process moves to a state 1418 where the buffer is read from the ring buffer 1208. The process continues to a state 1420 where the input controller 1204 forwards the buffer to the output controller 1210. The process then moves to the state 1410 as described above.

Returning to the decision state 1402, if the input controller 1202 does not find a minimum of N/2 back-to-back buffers in Port A, the process moves to a decision state 1422 where the input controller 1204 determines whether the stored buffers for Port B satisfy the same condition. If a minimum of N/2 back-to-back buffers in Port B are found, the process moves to a state 1424 where a location pointer is set to the first valid buffer location on Port B. The process then moves to the state 1418 as described above.

Returning to the decision state 1422, if the input controller 1204 does not find a minimum of N/2 back-to-back buffers in Port B, the process moves to a decision state 1402 as described above.

Figure 15:
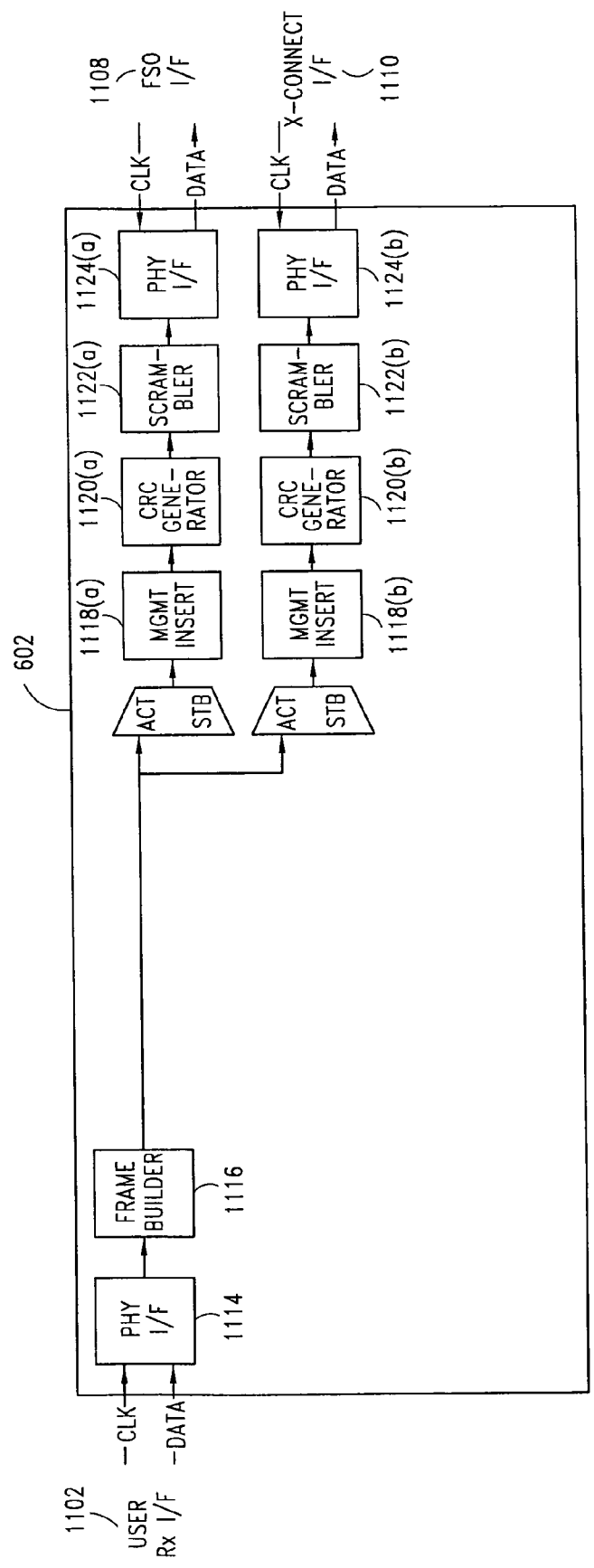
FIG. 15 is a diagram showing the data flow path through the FPGA of OTU 102(a) from FIG. 8 when transmitting data on the primary link 106(a) and the cross-connect link 108(a).

FIG. 15 is a diagram showing the data flow path through the FPGA of OTU 102(a) from FIG. 8 when transmitting data on the communication link 106(a)(1) and the communication link 108(a)(1). The PHY I/F module 1114 handles the interface with the physical layer of the transmission medium. The PHY I/F module 1114 provides a bit stream to the frame builder 1116. The frame builder 1116 is configured to frame the bit stream (user's data) for transmission within a superframe.

The superframe is provided to management insert modules 1118(a)-(b). The management insert modules 1118(a)-(b) are configured to insert management messages within the superframe. The mgmt insert module 1118(a)-(b) provides the superframe to the CRC generators 1120(a)-(b). The CRC generators 1120 insert error detection and/or correction data into the superframe. The superframe is then received by scrambler modules 1122(a)-(b). The scrambler module 1122 is configured to scramble the data within the superframe. The scrambler modules 1122(a)-(b) provide the superframe to physical layer I/F modules 1124(a)-(b). The PHY I/F module 1124(a) provides the interface to the physical layer transmission medium for the link. The superframe received by the physical layer I/F 1124(b) is configured for transmission as an optical signal via the cross-connect I/F 1110. The superframe configured for transmission as the I/F 1108 and as the cross-connect I/F 1110 will include the same payload as well as the same sequence number. Similar management information can also be common between the two superframes.

Figure 16:
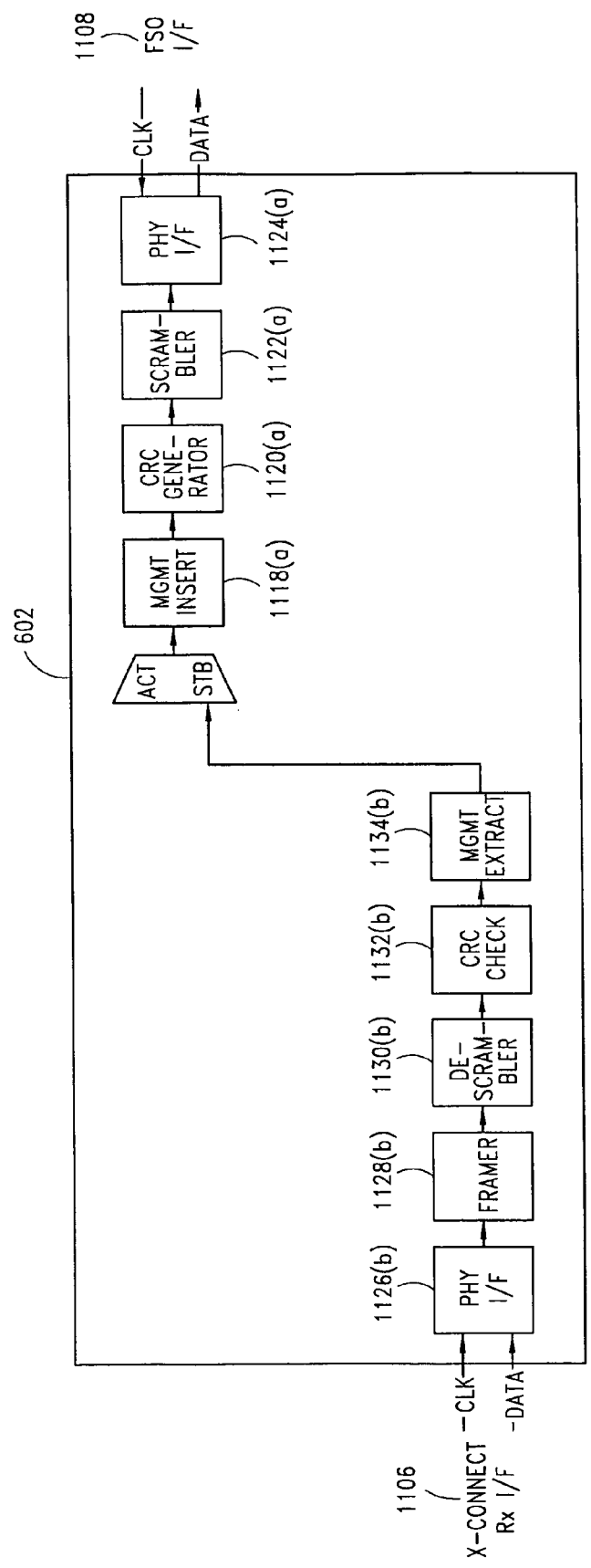
FIG. 16 is a diagram showing the data flow path through the FPGA of OTU 102(c) from FIG. 8 when transmitting data on the redundant link 106(b).

FIG. 16 is a diagram showing the data flow path through the FPGA of OTU 102(c) from FIG. 8 when transmitting data on the communication link 106(b)(1). The cross-connect RX I/F 1106 data path will be described. Superframes received via the cross-connect RX I/F 1106 is provided to the PHY interface (I/F) module 1126(b). The PHY I/F module 1124(b) provides the interface to the physical layer transmission medium for the link. The data received via the cross-connect RX I/F 1106 is in the form of the superframe as described above. The superframe is received by a framer 128(b). A descrambler 130(b) receives the superframe from the framer

1128(*b*). The descrambler 1130(*b*) descrambles the received superframe. A CRC check module 1132(*b*) receives its respective superframe and verifies the validity of the payload. The superframe is provided to a management extraction module 1134(*b*). The management extraction module 1134(*b*) is configured to extract the management messages from the superframe. Once the management data has been extracted from the superframe by the management extraction module 1134(*a*), the superframe received from the management extraction module 1134(*b*) is forwarded to the management insertion module 1118(*b*). Management information is inserted into the superframe by the management insertion module 1118(*a*). The management insert modules 1118(*a*) is configured to insert management messages within the superframe. The mgmt insert module 1118(*a*) provides the superframe to the CRC generators 1120(*a*). The CRC generators 1120 insert error correction and/or correction data into the superframe. Scrambler modules 1122(*a*) then receive the superframe. The scrambler module 1122 is configured to scramble the data within the superframe. The scrambler modules 1122(*a*) provide the superframe to physical layer I/F modules 1124(*a*). The PHY I/F module 1124(*a*) converts the electrical signal received from the scrambler 1122(*a*) to an optical signal for transmission as the I/F 1108.

Figure 17:
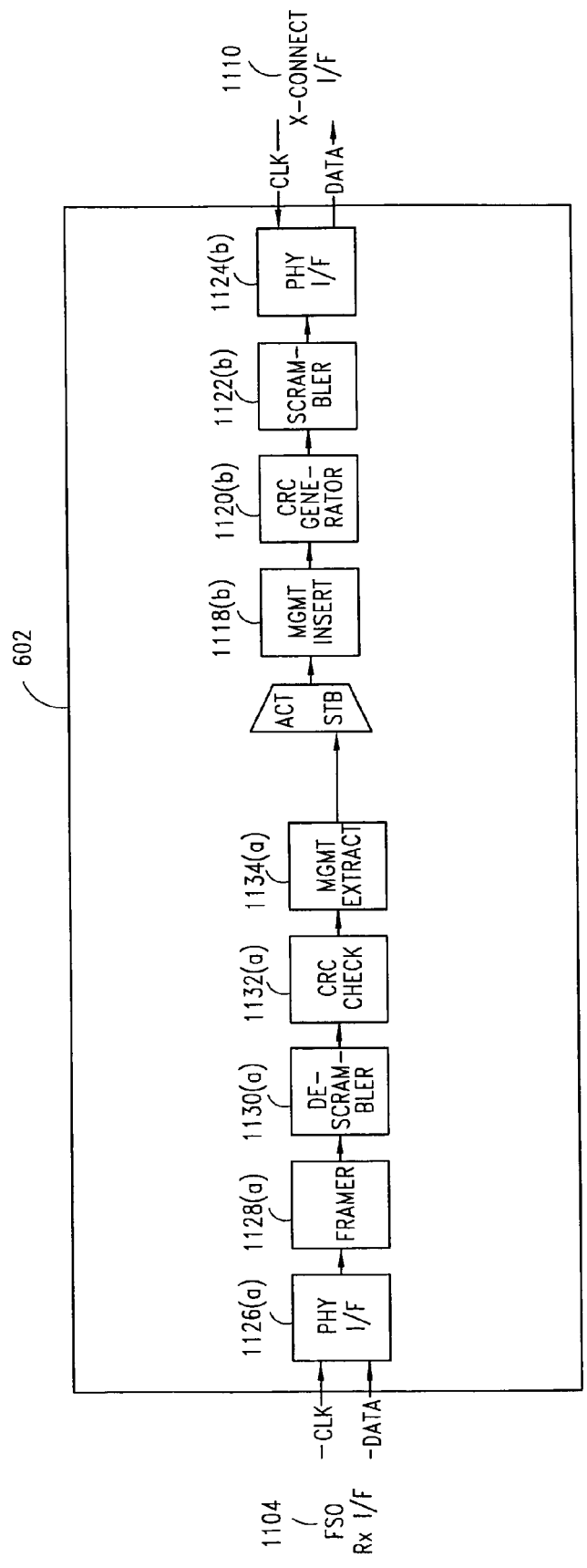
FIG. 17 is a diagram showing the data flow path through the FPGA of OTU 102(d) from FIG. 8 when receiving data on the redundant link 106(b).

FIG. 17 is a diagram showing the data flow path through the FPGA of OTU 102(*d*) from FIG. 8 when receiving data on the communication link 106(*b*)(1). The framer module 1128(*a*) receives data and clock information from the PHY I/F 1126(*a*). The received data and clock information is provided to the descrambler module 1130(*a*). The descrambler module 1130(*a*) provides the data and the clock information to the CRC check module 1132(*a*). The CRC check module 1132(*a*) provides the data and clock information to the mgmt extract module 1134(*a*). The mgmt extract module 1134(*a*) provides the data and clock information to the mgmt insert module 1118(*b*). The management insert module 1118(*b*) is configured to insert management messages within the superframe. The mgmt insert module 1118(*b*) provide the superframe to the CRC generators 1120(*b*). The CRC generators 1120 insert error detection and/or correction data into the superframe. The superframe is then received by scrambler module 1122(*b*). The scrambler module 1122 is configured to scramble the data within the superframe. The scrambler modules 1122(*b*) provides the superframe to the PHY I/F module 1124(*b*). The PHY I/F module 1124(*b*) provides the interface to the physical layer transmission medium for the link. The superframe received by the physical layer I/F 1124(*b*) is configured for transmission as an optical signal via the cross-connect I/F 11110.

Figure 18:
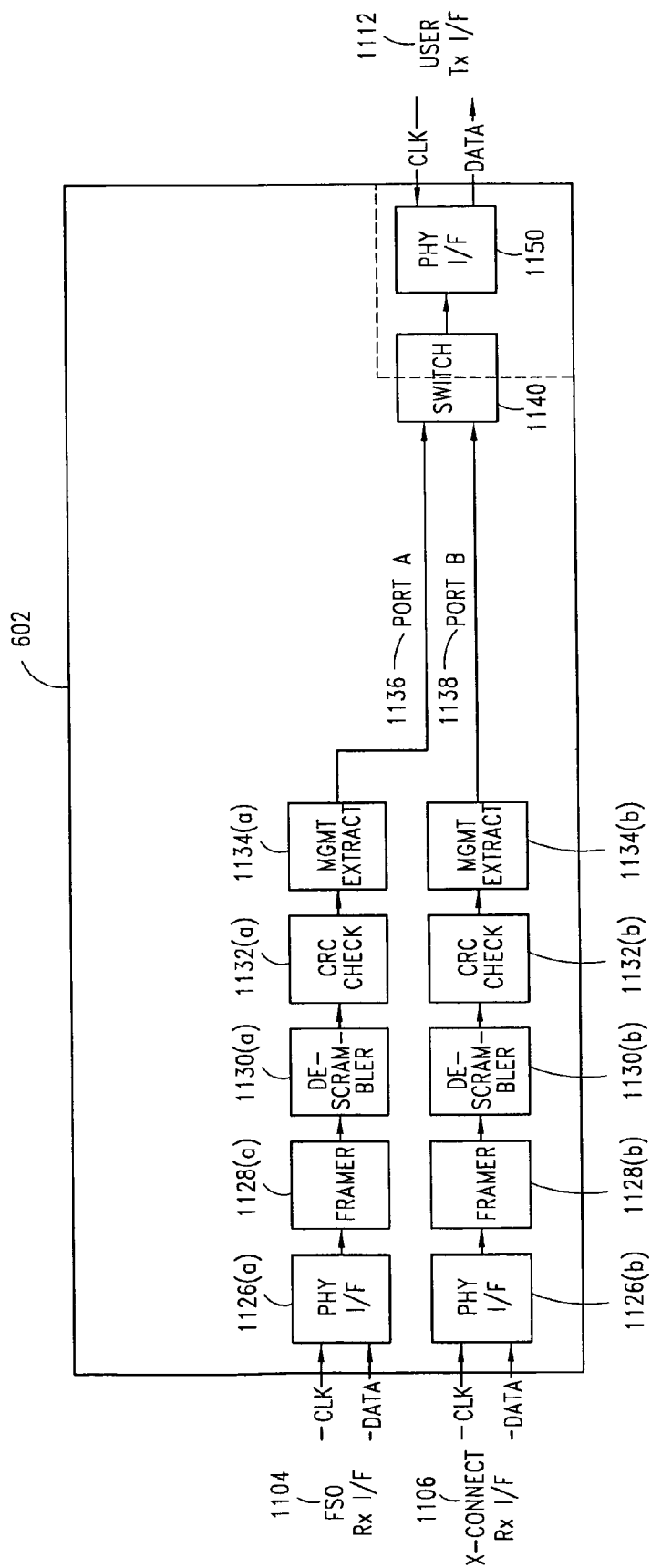
FIG. 18 is a diagram showing the data flow path through the FPGA of OTU 102(b) from FIG. 8 when receiving data on the primary link 106(a) and the cross-connect link 108(b).

FIG. 18 is a diagram showing the data flow path through the FPGA of OTU 102(*b*) from FIG. 8 when receiving data on the primary link 106(*a*)(1) and the cross-connect link 108(*b*)(1). The RX I/F 1104 data path will now be described. A similar description will also be provided for data received via the cross-connect RX I/F 1106. Superframes received via the RX I/F 1104 and the cross-connect RX I/F 1106 are provided to a PHY interface (I/F) 1126(*a*)-(*b*). The PHY I/F modules 1126(*a*)-(*b*) provide the interface to the physical layer transmission mediums for their respective links. The phy I/F 1126(*a*) is configured to convert the optical signal to an electrical signal for processing by the FPGA 602. The phy I/F 1126(*b*) is configured to receive the electrical signal from the cross-connect RX I/F 1106. The data received via the RX I/F 1104 and the cross-connect RX I/F 1106 is any form of a superframe as described above. A framer 1128(*a*)-(*b*) receives the superframes. A descrambler 1130(*a*)-(*b*) receives the superframe from its respective framer. The descrambler 1130(*a*)-(*b*) descrambles the received superframe. A CRC check module 1132(*a*)-(*b*) receives its respective superframe and verifies the validity of the payload. The superframe is provided to a management extraction module 1134(*a*)-(*b*). The management extraction module 1134(*a*)-(*b*) is configured to extract the manager messages from the superframe. Once the management data has been extracted from the superframe by the management extraction module 1134(*a*), the data is provided to a port A 1136.

Once the management extraction module 1134(*b*) extracts the management information from the superframe received via the cross-connect RX I/F 1106, it is provided to a port B 1138. Once the OTU 102(*b*) receives these same superframes via both the RX I/F 1104 and the cross-connect RX I/F 1106, a switch 1140 determines which of the superframes are forwarded to the user TX I/F 1112.

The methods and systems described above can be implemented using software and/or hardware. For example, the software may advantageously be configured to reside on an addressable storage medium and be configured to execute on one or more processors. Thus, the software and/or hardware may include, by way of example, components, such as software components, object-oriented software components, class components and task components, processes, functions, attributes, procedures, subroutines, segments of program code, drivers, firmware, microcode, circuitry, data, databases, data structures, tables, arrays, variables, FPGAs, ASICs, controllers, computers, and firmware to implement those methods described above. The functionality provided for in the software and/or hardware may be combined into fewer components or further separated into additional components. Additionally, the components may advantageously be implemented to execute on one or more computers.

The foregoing description details certain preferred embodiments of the present invention and describes the best mode contemplated. It will be appreciated, however, that no matter how detailed the foregoing appears in text, the invention can be practiced in many ways. As noted above, these same methods can be used in other communication systems using the same or similar hardware and/or software. As is also stated above, it should be noted that the use of particular terminology when describing certain features or aspects of the present invention should not be taken to imply that the terminology is being re-defined herein to be restricted to including any specific characteristics of the features or aspects of the invention with which that terminology is associated. The scope of the present invention should therefore be construed in accordance with the appended claims and any equivalents thereof.

What is claimed is:

1. A method for communicating using a primary link and a redundant link, the method comprising:
    transmitting a first series of packets from a first transceiver to a second transceiver via a primary link;
    transmitting a second series of packets which corresponds to the first series of packets from the first transceiver to the second transceiver via a redundant link;
    determining whether the first series of packets or the second series of packets includes one or more errors; and
    forwarding either the first series of packets or the second series of packets based on which one of the series of packets includes one or more errors; wherein the primary link is a free space optical link.

2. The method as recited in claim 1, wherein determining whether the first series of packets or the second series of packets includes one or more errors includes performing cyclic redundancy checking (CRC) in the first and second series of packets.

3. The method as recited in claim 1, wherein the redundant link is a microwave link.

4. The method as recited in claim 1, wherein the redundant link is a radio frequency (RF) link.

5. The method as recited in claim 1 further comprising forwarding either the first series of packets or the second series of packets to a combiner/splitter module.

6. A method for communicating using a primary link and a redundant link, the method comprising:
   receiving a first data packet in the form of a first protocol at a first transceiver;
   formatting the first data packet for transmission in a frame that utilizes a second protocol different than the first protocol, the second protocol utilizing frame identifiers;
   transmitting the formatted first data packet to a second transceiver via a primary link;
   transmitting the formatted first data packet to the second transceiver via a redundant link;
   determining whether the first data packet received via the primary link or the first data packet received via the redundant link includes one or more errors;
   selecting either the first data packet received via the primary link or the first data packet that was received via the redundant link based on which one of the data packets includes one or more errors; and
   transmitting the selected data packet using the first protocol; wherein the primary link is a free space optical link.

7. The method as recited in claim 6, wherein determining whether the first series of packets or the second series of packets includes one or more errors includes performing cyclic redundancy checking (CRC) in the first and second series of packets.

8. The method as recited in claim 6, wherein the redundant link is a microwave link.

9. The method as recited in claim 6, wherein the redundant link is a radio frequency (RF) link.

10. The method as recited in claim 6, further comprising forwarding either the first series of packets or the second series of packets to a combiner/splitter module.

11. A communications system comprising:
   a first link including a first transceiver and a second transceiver, wherein the first transceiver is configured to transmit a first series of packets to the second transceiver when the first link is acting as a primary link;
   a second link including a third transceiver and a fourth transceiver, wherein the third transceiver is configured to transmit a second series of packets to the fourth transceiver when the second link is acting as a redundant link, wherein the second series of packets corresponds to the first series of packets;
   a link controller module in the second transceiver configured to detect one or more errors in the first series of packets;
   wherein, if the first series of packets includes one or more errors, the second link is configured to assume the role as the primary link and first link assumes the role as the redundant link;
   wherein one of the first link or the second link is a free space optical link.

12. The communications system as recited in claim 11, wherein the other one of the first link or the second link is a microwave link.

13. The communications system as recited in claim 11, wherein the other one of the first link or the second link is a radio frequency link.

14. The communications system as recited in claim 11, wherein the communications system further includes a first combiner/splitter module coupled to the first and third transceivers, and a second combiner/splitter module coupled to the second and fourth transceivers.

15. The communications system as recited in claim 11, wherein the link controller module is configured to detect one or more errors in the first series of packets using cyclic redundancy checking.

16. The communications system as recited in claim 11 further comprising a third link coupled between the first transceiver and the third transceiver and a fourth link coupled between the second transceiver and the fourth transceiver.

17. The communications system as recited in claim 11, wherein the link controller includes a protection unit, wherein the protection unit is configured to change a status of the third transceiver if the first series of packets includes one or more errors.

18. A communications system comprising:
   first transmitter means for transmitting a series of packets on a first link acting as a primary link;
   a first receiver for receiving the series of packets over the first link;
   second transmitter means for transmitting the series of packets on a second link acting as a redundant link;
   a second receiver for receiving the series of packets over the second link;
   a link controller module in the first receiver, wherein the link controller is configured to determine whether one or more errors are present in the first series of packets and to forward the first series of packets if no errors are present, and, if one or more errors are present, to forward the second series of packets;
   wherein at least one of the first link or the second link is a free space optical link.

19. The communications system as recited in claim 18, wherein the link controller module is configured to determine whether one or more errors are present in the first series of packets using cyclical redundancy checking (CRC).

20. The communications system as recited in claim 18, further comprising a third link coupling the first receiver to the second receiver.

21. The communications system as recited in claim 18, wherein the link controller includes a protection unit, wherein the protection unit is configured to change a status of the first receiver if the first series of packets includes one or more errors.

22. The communications system as recited in claim 18 wherein the other one of the first link or the second link is a microwave link.

23. The communications system as recited in claim 18, wherein the other one of the first link or the second link is a radio frequency (RF) link.

24. The communications system as recited in claim 18, wherein the communications system further includes a first combiner/splitter module coupled to each of the first and second transmitter means, and a second combiner/splitter module coupled to each of the first and second receivers.

* * * * *